United States Patent
Ukita et al.

(12)

(10) Patent No.: US 6,622,174 B1
(45) Date of Patent: Sep. 16, 2003

(54) SYSTEM FOR SENDING, CONVERTING, AND ADDING ADVERTISEMENTS TO ELECTRONIC MESSAGES SENT ACROSS A NETWORK

(75) Inventors: Yoshitaka Ukita, Tokyo (JP); Shoichi Osawa, Aichi (JP); Koichi Hayasaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/131,044

(22) Filed: Aug. 6, 1998

(30) Foreign Application Priority Data

| Aug. 15, 1997 | (JP) | ............. P09-220326 |
| Aug. 15, 1997 | (JP) | ............. P09-220409 |
| Sep. 2, 1997 | (JP) | ............. P09-237275 |

(51) Int. Cl.[7] .................. G06F 15/16; G06F 17/60
(52) U.S. Cl. ................ 709/246; 709/206; 705/14
(58) Field of Search ................ 705/14; 709/217, 709/203, 219, 206, 246; 379/93.08; 725/32, 34–36

(56) References Cited

U.S. PATENT DOCUMENTS

| 5,513,254 A | * | 4/1996 | Markowitz ............ 379/100.17 |
| 5,689,550 A | * | 11/1997 | Garson et al. ............ 379/88.18 |
| 5,721,827 A | * | 2/1998 | Logan et al. ............ 709/217 |
| 5,796,945 A | * | 8/1998 | Tarabella ............ 709/219 |
| 5,805,810 A | * | 9/1998 | Maxwell ............ 709/206 |
| 5,826,034 A | * | 10/1998 | Albal ............ 709/239 |
| 5,848,134 A | * | 12/1998 | Sekiguchi et al. ............ 379/93.15 |
| 5,911,776 A | * | 6/1999 | Guck ............ 709/217 |
| 5,913,030 A | * | 6/1999 | Lotspiech et al. ............ 709/203 |
| 5,913,040 A | * | 6/1999 | Rakavy et al. ............ 709/232 |
| 5,933,811 A | * | 8/1999 | Angles et al. ............ 705/14 |
| 5,937,162 A | * | 8/1999 | Funk et al. ............ 709/206 |
| 5,948,061 A | * | 9/1999 | Merriman et al. ............ 709/219 |
| 5,974,449 A | * | 10/1999 | Chang et al. ............ 709/206 |
| 5,983,268 A | * | 11/1999 | Freivald et al. ............ 709/218 |
| 5,999,912 A | * | 12/1999 | Wodarz et al. ............ 705/14 |
| 6,002,393 A | * | 12/1999 | Hite et al. ............ 345/719 |
| 6,025,931 A | * | 2/2000 | Bloomfield ............ 358/402 |
| 6,160,989 A | * | 12/2000 | Hendricks et al. ............ 725/36 |

FOREIGN PATENT DOCUMENTS

| WO | WO 97/21183 | * | 6/1997 | ......... G06F/151/00 |

OTHER PUBLICATIONS

Corcoran, "The Marketers are On–Lining Up to You; Interactive Ads, Other Gimmicks Kick Off the Internet's New Era", Sep. 27, 1995, The Washington Post, Final Edition, pp. F.01ff.*

McAllester, "Privacy on the Internet Film Agrees not to share consumer data", Dec. 11, 1996, Newsday, Combined editions, pp. A.51ff.*

Bray, "Firm offers free e–mail with ads Juno Online Systems to start service Monday", Apr. 19, 1996, Boston Globe, City Editio pp. 88ff.*

* cited by examiner

Primary Examiner—Glenton B. Burgess
Assistant Examiner—Bradley Edelman
(74) Attorney, Agent, or Firm—Jay H. Maioli

(57) ABSTRACT

An information communication system includes a server device and information communication terminals connected by a network, in which the server device provides data communication services according to requests from the information communication terminals. The server device stores information relating to users of the information communication terminals including the identification information thereof, and provides advertisement information to the information communication terminals via the network, this advertisement information corresponds with the information relating to the user of the requesting party stored in server, according to requests from the information communication terminal including the identification information of the user. The information communication terminal generates and sends requests to be sent to the server device, including user identification information, and obtains the advertisement information from the server device and outputs this obtained advertisement information.

16 Claims, 18 Drawing Sheets

FIG. 4

| MEMBER IDENTIFICATION INFORMATION | | NAME | ADDRESS | DATE OF BIRTH | SEX | OCCUPATION | CITY OF EMPLOYMENT | ANNUAL INCOME | INTERESTS | |
|---|---|---|---|---|---|---|---|---|---|---|
| MEMBER ID | PASSWORD | | | | | | | | | |
| xxxxx | xxxxx | ○○○○○ | ---, MINATO-KU, TOKYO | 10/10/56 | M | EMPLOYEE | TOKYO | ¥7,000,000 | GOLF | |

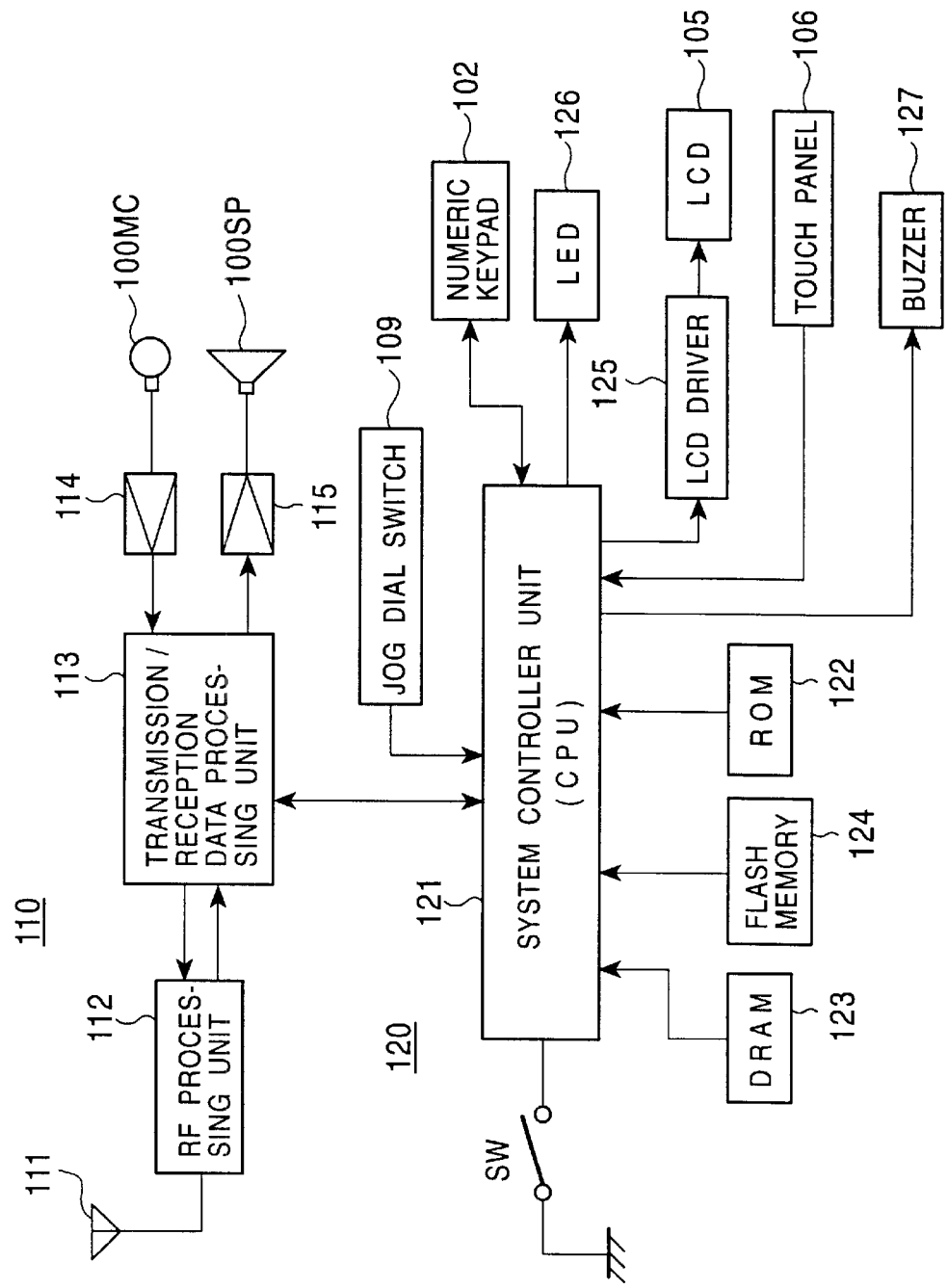

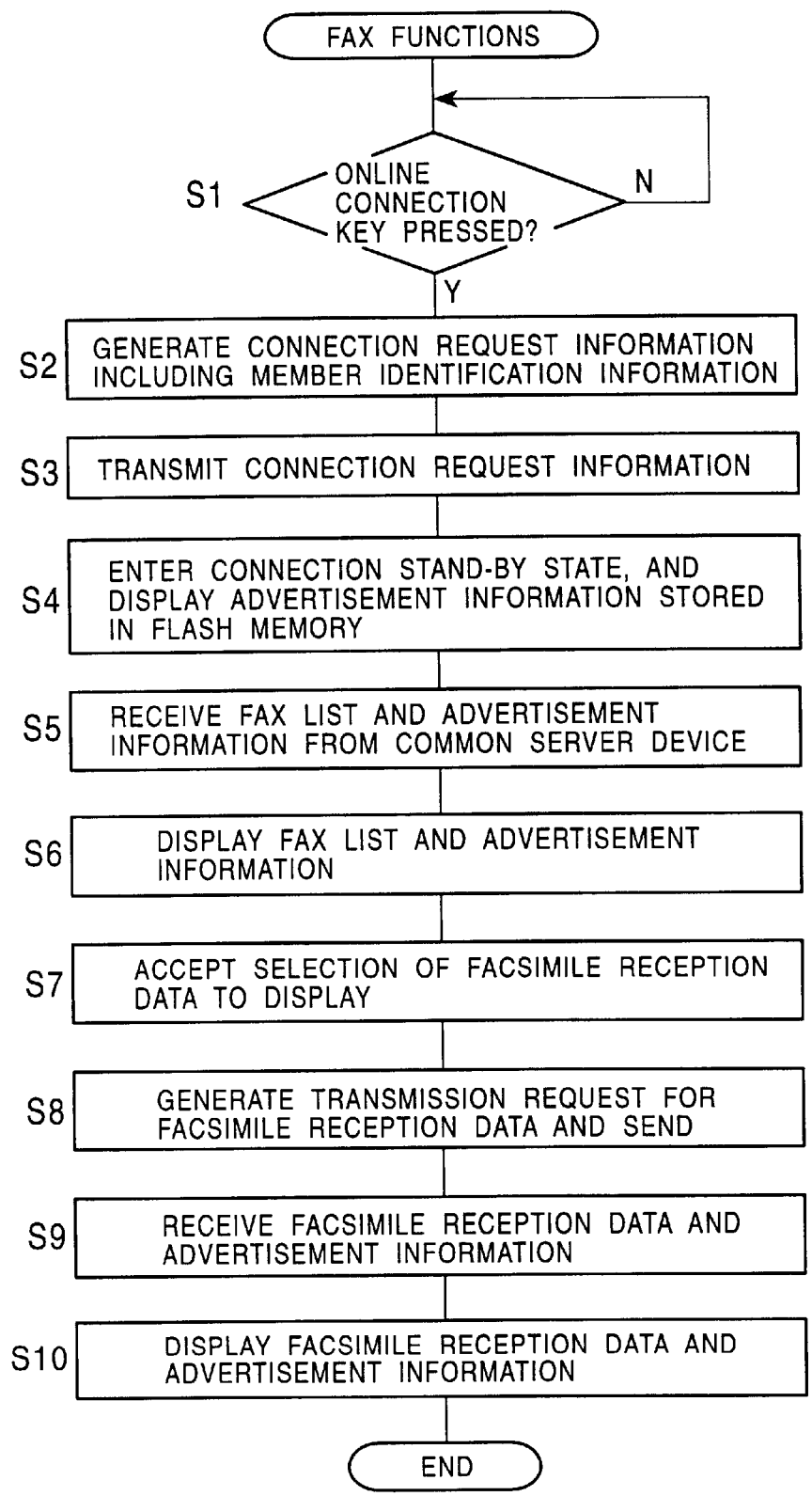

SYSTEM FOR SENDING, CONVERTING, AND ADDING ADVERTISEMENTS TO ELECTRONIC MESSAGES SENT ACROSS A NETWORK

BACKGROUND OF THE INVENTION

1. Field of the Invention

The present invention relates to an information communication system which responds to requests from an information communication terminal for example, and provides advertisement information when performing data communication service such as facsimile communication, electronic mail communication, information providing service, and so forth.

2. Description of the Related Art

Recently, the widespread use of portable wireless communication terminals such as PHS terminals in Japan and increased speed of data transmission using such portable wireless communication terminals has brought attention to wireless data communication services which facilitate wireless communication of various types of data such as text data and image data, in addition to voice data.

For example, in the case of using a PHS terminal, data communication can be made at transfer speeds of 32 kbit/second, which is comparable to the 28.8 kbit/second or 33.6 kbit/second transfer speeds for analog telephone lines using a modem. Thus, an environment is falling into place in which exchange of electronic mail, facsimile communication, etc., can be performed outdoors using portable wireless communication terminals.

Now, there are requests for allowing data communication service such as facsimile communication, electronic mail communication, information providing service, and so forth, at as low a cost as possible. Particularly, regarding users of portable wireless communication terminals who use data communication services via wireless communication lines, the line usage fees for using the portable wireless communication terminals are higher than generally used public lines using telephone cables, and accordingly, there is a strong desire to have various types of data communication services at minimal fees.

Accordingly, a system can be conceived in which advertisements for corporations or products are attached to the data communication services. Thus, data communication services can be provided at low costs by providing advertisement information to the user of the information communication terminal, charging advertisement fees from the advertiser, and using these fees to cover the costs necessary for providing the data communication services.

However, there is a desire from the advertisers paying the advertising fees, the provide the advertisements in an effective manner. For example, providing advertisements for golfing goods only to golfers is an example of providing advertisements specialized for that consumer segment, thereby increasing the effectiveness of the advertisements.

Advertisement information is attached to main information provided by the data communication service and provided to the information communication terminal, so that both the main information and advertisement information are displayed on the display screen of the information communication terminal.

Such usage of data communication services is highly advantageous, since not only can the user of the information communication terminal receiving data communication services with advertisement have data communication services at low costs, but also can obtain necessary information from the advertisement, e.g., information regarding a product which the user is contemplating purchasing.

However, since both the main information and advertisement information are displayed on the display screen of the information communication terminal, the display space for the main information is reduced by the amount of space taken up by the advertisement information, and in the event that there is a great amount of main information, the advertisement information may interfere with viewing of the main information. Particularly, regarding portable wireless communication terminals, the portability thereof requires reduction in size and weight, meaning that the size of the display screen is limited, and hence, there is a great possibility that displaying of the advertisement information may interfere with viewing of the main information.

In this way, while not a constant problem, displaying of the advertisement information may interfere with viewing of the main information in the event that there is a great amount of main information or in cases where the user desires to carefully view only the main information.

SUMMARY OF THE INVENTION

Accordingly, it is an object of the present invention to provide an information communication system whereby advertisement information provided to users of information communication terminals using data communication services can be provided in a more effective manner.

According to the information communication system of the present invention, advertising information with the user of the information communication terminal making the request as the object thereof is attached to information being provided according to the request from the information communication terminal, by means of the information providing means of the server device, and thus the information is provided to the information communication terminal making the request.

In other words, the user information storing means of the server device has stored therein various types of information about the each of the users of the information communication terminals, such as user identification information for identifying the users, the name, age, sex, and so forth of the users, etc.

Then, the user information relating to the user is referred to based on identification information of the user of the information communication terminal included in the request information from the information communication terminal, and in the event that the user is an object of providing the advertisement information, i.e., in the event that the user meets the criteria specified by the advertiser who is the provider of the advertisement, this advertisement information is provided to the information communication terminal which has sent a request.

For example, in the event that the criteria specified by the advertiser is to provide advertisement information A only to men over 30 years of age, the advertisement information A is provided only in the event that the user of the information communication terminal meets the criteria specified by the advertiser, based on the user information in the user information storing means.

Accordingly, the advertiser can target the users of the information communication terminal to provide advertisements to, based on the user information in the user information storing means, and so advertisement information can be provided in an effective manner, unlike providing advertisement to random information communication terminals.

According to this information communication system, the information communication terminal is comprised of a portable terminal with wireless communication functions. Accordingly, the user can receive pertinent provision of service from arbitrary locations, away from the office or home.

At the server device, the request from the information communication terminal is received, and advertisements are attached to the information to be provided to the information communication terminal and sent thereto in the event that the request has information indicating permission of attaching the advertisement.

Advertisements are not attached to the information to be provided to the information communication terminal in the event that the request has information indicating non-permission of attaching the advertisement. Thus, the user of the information communication terminal can select whether or not to permit attachment of advertisements to the information to be provided from the server device.

Accordingly, in the event that there will be no problem in viewing the information requested from the server device even if there is an advertisement attached thereto, the use can select to have information provided with an advertisement attached thereto, and thus take advantage of inexpensive information providing service by means of discounts to the charges for receiving the information or discounts to the line usage fees, and so forth. On the other hand, in the event that the user of the information communication terminal is receiving important information, the user can receive information without advertisements if he/she desires to have information without advertisement even if it means that there are not discounts to the charges for receiving the information or discounts to the line usage fees.

BRIEF DESCRIPTION OF THE DRAWINGS

FIG. 4 is a diagram illustrating an example of a member data table provided to the server device according to the present invention;

FIG. 6 is a block diagram of an embodiment of the information communication terminal according to the present invention;

FIG. 7 is a flowchart illustrating the processing of the member terminal in the case that facsimile communication functions are executed in an embodiment of the information communication system according to the present invention;

DESCRIPTION OF THE PREFERRED EMBODIMENTS

Embodiments of the information communication system according to the present invention will now be described with reference to the Figures.

First Embodiment

In the present embodiment, an information communication system is comprised of a plurality of information communication terminals in contract relationship with a single common server device connected by a network.

In the case of the present embodiment, the information communication terminal is comprised of a portable wireless communication terminal, having functions for receiving information services from the common server, and further comprising the telephone functions of a PHS (Personal Handy-phone System), and data communication functions of facsimile and electronic mail. The arrangement is such that sending information from each portable wireless communication terminal to the desired other party and receiving information addressed to self, for facsimile and electronic mail, is performed by each portable wireless communication terminal cooperating with the aforementioned server device.

Further, according to this embodiment, in the event that the server device performs data communication services such as information providing services, facsimile services, electronic mail services, etc., advertisement information from corporations or the like is added to the information to be provided to the user of the portable wireless communication terminal. Thus, data communication services can be provided at low costs by adding advertisements to the provided data communication services, and collecting advertisement fees from the advertiser, which is a corporation or the like providing the advertisements.

Also, according to the present embodiment, as described in detail later, the advertisement information is not provided to all users of portable wireless communication terminals; rather, the advertisement information is provided to users of portable wireless communication terminals to which the advertiser wishes to provide advertisements to, based on the specifications of the advertiser which is a corporation or the like providing advertisements.

In this way, the information communication system according to the present embodiment is capable of targeting users of the portable wireless communication terminals to provide advertisements to, allowing for more effective providing of advertisements.

Description of the Network System

Figure 1:
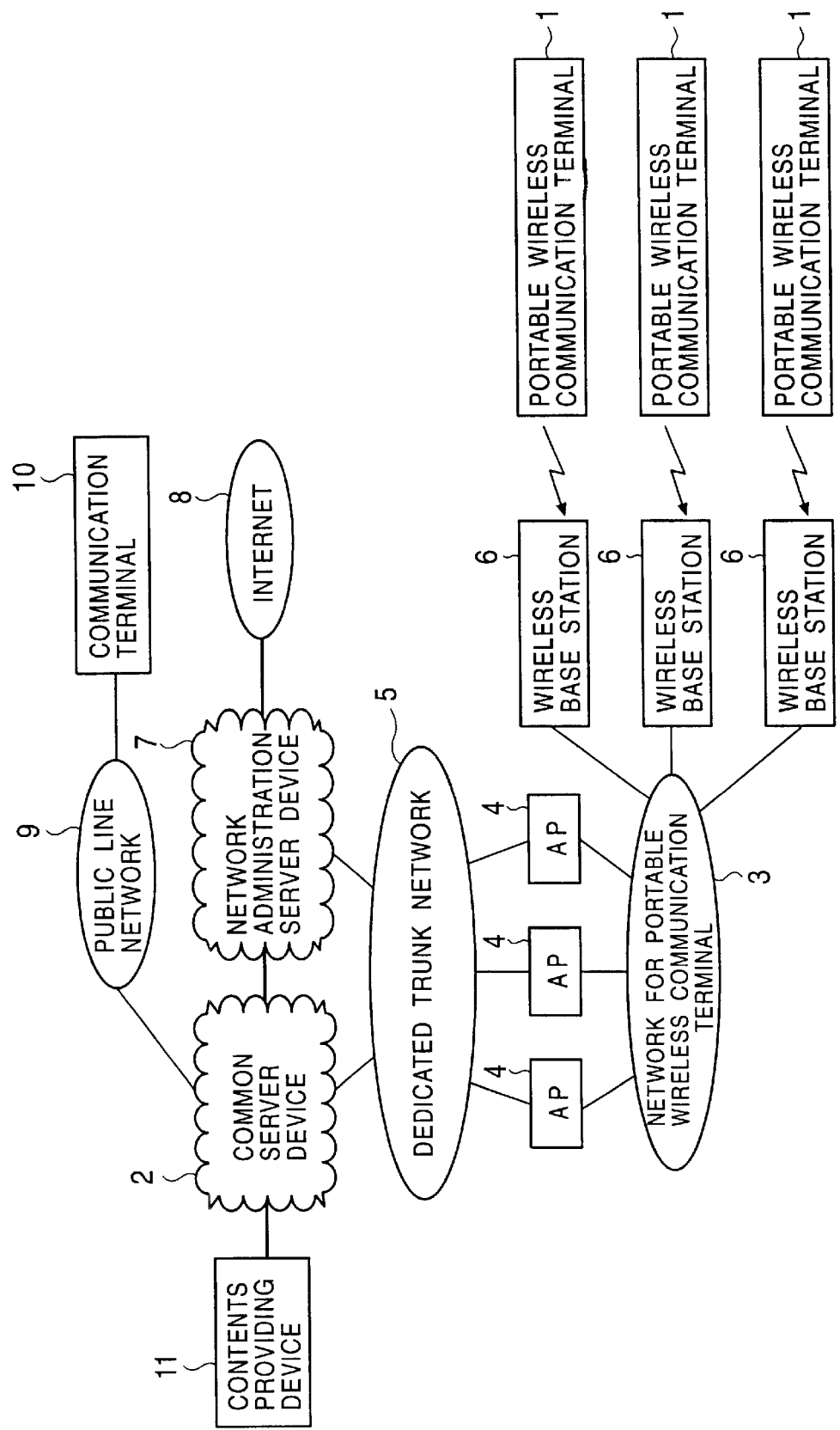
FIG. 1 is a diagram illustrating the conceptual configuration of the entirety of a communication network to which the information communication system according to the present invention is applied.

FIG. 1 is a diagram for describing the conceptual configuration of a communication network system to which the embodiment of the present invention is applied. In FIG. 1, 1 is a portable wireless communication terminal which is in contract relation with a common server device, and 2 is the common server device. A plurality of the portable wireless communication terminals 1 are connected with the common server device 2 via a network 3 for portable wireless communication terminals, and a dedicated trunk network 5 which is connected to the network 3 by one or a plurality of access points 4.

Although portable wireless communication terminals not in contract relation with the common server device 2 are connected to the portable wireless communication terminal network 3 as well, the only portable wireless communication terminals which can receive data communication services from the common server device 2 are portable wireless communication terminals 1 which have entered into a contract relation with the common server device 2 beforehand. In order to avoid confusion between portable wireless communication terminals not in contract relation with the common server device 2, in the following description, portable wireless communication terminals in contract relation with the common server device 2 shall be referred to as "member terminals".

Wireless connection is made by a plurality of member terminals 1 and other portable wireless communication terminals of the same type to wireless base stations 6 provided in area increments taking into consideration the range of airwaves, for example. Connections between the wireless base stations 6 in the portable wireless communication terminal network 3 employs optical cable, for example.

A network administrating server device 7 which performs administration of the dedicated trunk network 5 is connected to the network 5. This network administrating server device 7 performs so-called routing between the common server device 2 and the member terminals 1. Accordingly, when viewed from the perspective of routing administration by the network administrating server device 7, the common server device 2 can be viewed as one of the terminal devices connected to the dedicated trunk network. Incidentally, in this case, the network administrating server device 7 is also connected to the Internet 8.

Also, in the present embodiment, the network administrating server device 7 is also directly connected to the common server device 2, and is arranged such that the network administrating server device 7 sends to the common server device 2, access history from the member terminal 1 to the common server device 2, and so forth.

That is to say, according to the present embodiment, the common server device 2 performs overall member administration such as gathering billing logs of the member terminals 1.

In other words, in the case of the present embodiment, the member terminal 1 is in contract relation with the common server device 2, and is not in contract relation with the network administrating server device 7.

The common server device 2 relegates administration of the network connections for the member terminals 1 to the network administrating server device 7, so there is also a contract relation between the common server device 2 and the network administrating server device 7. Accordingly, the common server device 2 can also be connected in the exactly same relation with other dedicated trunk networks and the network administrating server devices thereof as with the aforementioned dedicated trunk network 5 and the network administrating server device 7 thereof.

In the present embodiment, though when viewed from the common server device 2, each of the member terminals 1 are appropriated a specific dedicated trunk network such that access from each member terminal 1 to the common server device 2 is subjected to administration so as to pass through the dedicated trunk network appropriated to that member terminal; but when viewed from the member terminal 1, the contract relation between the common server device 2 and the network administrating server device 7 is totally irrelevant, so the member terminal 1 simply accesses the common server device 2 alone and is subjected to administration by the common server device 2 alone.

According to such a network administration configuration, by means of providing the common server device 2 with all of the service functions of each of the network administrating server devices 7, the user of the member terminal 1 need not enter into contract relation with each of the network administrating server devices 7 in order to receive the various services provided by each of the network administrating server devices 7, but simply needs to enter into contract relation with the common server device 2, which is extremely handy.

The common server device 2 is connected to a public line network 9, and as described later, the member terminal 1 has functions for exchanging communication data with communication terminals 10 connected to this public line network 9, such as facsimile terminals, personal computers, and so forth.

Further, according to the present embodiment, the common server device 2 has a storage unit comprising a portion of the database of information to be provided, in order to carry out information providing services. Also, the common server device 2 is connected with a contents providing device 11, and information comprising a portion of the database of information to be provided to the member is obtained from this contents providing device 11 and is provided to the member 1.

The contents providing devices 11 are each provided by providing companies which have unique information to be provided, and provide the information thereof to the member terminal 1 via the common server device 2 by entering into the contract relation with the service company owning the common server device 2. In FIG. 1, only one contents providing device 11 is shown, but it goes without saying that a plurality of contents providing devices 11 may be connected to the common server device 2.

Also, there are cases in which the form of connection between the common server device 2 and the contents providing device 11 is a connection by a dedicated line, and there are cases in which the connection is made via a network such as the Internet.

In the case of the present embodiment, information from the contents providing device 11 connected to the common server device 2 via the dedicated line or network is provided to the member terminal 1 by means of the member terminal 1 making a request for the service, the common server device 2 accessing the aforementioned contents providing device 11 and obtaining the information, and providing the information to the member terminal 1.

Although an arrangement can be conceived wherein information from the contents providing device 11 is constantly obtained and stored in the internal memory section of the common server device 2, thereby keeping the contents stored within the internal memory unit updated, there is a problem in that the memory unit of the common server device 2 would become immense in the event that there are a great number of contents providing devices 11 and a great amount of information to be provided.

Conversely, as shown in the present embodiment, an arrangement wherein information from the contents providing device 11 is provided to the member terminal 1 by means of the member terminal 1 making a request for the service, the common server device 2 accessing the aforementioned contents providing device 11 and obtaining the information, and providing the information to the member terminal 1, does not require a great size for the memory unit of the common server device 2. Also, as long as the information provided by the contents providing device 11 is constantly updated, the common server device 2 can provide the newest information to the member terminal 1 simply by obtaining the information from the contents providing device 11.

In the present embodiment, the arrangement is such that the common server device 2 is in contract relation with one or a plurality of contents providing devices 11, the information from the contents providing devices 11 being centrally gathered and provided to the member terminal 1, so the member terminal 1 does not need to enter into contact with each of the contents providing devices 11 to receive the necessary information from the common server device 2.

Also, regarding methods for the providing company having unique information to provide contents to the common server device 2, there are arrangements in which the contents are not provided to the common server device 2 by means of connection via a dedicated line or network such as described above, but by means of the contents providing company providing a recording medium such as a CD-ROM or the like to the common server device 2, and the common server device 2 storing the contents in the storage unit therein.

In the present embodiment, in the event that the user of a portable wireless communication terminal 1 enters into contract relation with the corporation owning the common server device 2, the portable wireless communication terminal 1 becomes a member terminal 1. For example, an arrangement may be conceived in which purchasing of the member terminal 1 by the user generates a contract relation with the common server device 2.

That is, at the time that a user purchases a portable wireless communication terminal as a member terminal 1, the member terminal 1 is provided beforehand with address information of a common server device 2 via specific dedicated trunk network for each terminal, this being stored in a non-volatile memory. This non-volatile memory also stores member identification information member such as ID and passwords for indicating that the terminal is a member terminal and for identification of the user of the member terminal. However, while writing registration to the member terminal 1 regarding address information of the common server device 2 or member identification information may be performed by a salesperson or by the purchaser at the time of purchasing the member terminal 1, it is preferable that such be registered to the member terminal 1 beforehand. In such an arrangement, there is no necessity for the operation of inputting the address, so the user can use the member terminal 1 without concern for the common server device.

Also, as described later, in the event of receiving information service from the common server device 2 with the member terminal 1 or in the event of initiating processing of facsimile communication or electronic mail communication with the member terminal 1, first, the member terminal 1 executes a process of automatically connecting to the common server device 2, using the address information and member identification information stored therein beforehand.

According to the present embodiment, the member terminal 1 has excellent portability, and allows for provision of various times of information services regardless of time or place, simply by accessing the common server device 2.

Also, the member terminal 1 realizes the facsimile communication and electronic mail communication functions and the related function by means of cooperating with the common server device 2. That is to say, the member terminal 1 does not have massive memory for such communication. Instead, the common server device 2 has memory or a memory area for the received data for each member terminal 1. Also, the member terminal 1 is arranged so as to relegate applications for realizing various functions, e.g., the application for display, to the common server device 2, except for minimal necessary applications (software for the microcomputer). That is, in the member terminal 1, in the event that the user performs a key operation equivalent to a request for obtaining a desired function, the request is sent to the common server device 2, and the application of the common server device 2 for the certain function is executed. The processing results of the application are then sent to the member terminal 1.

The above is an overview of this embodiment according to the present invention, but an even more detailed description of the configuration thereof will be now given.

Figure 2:
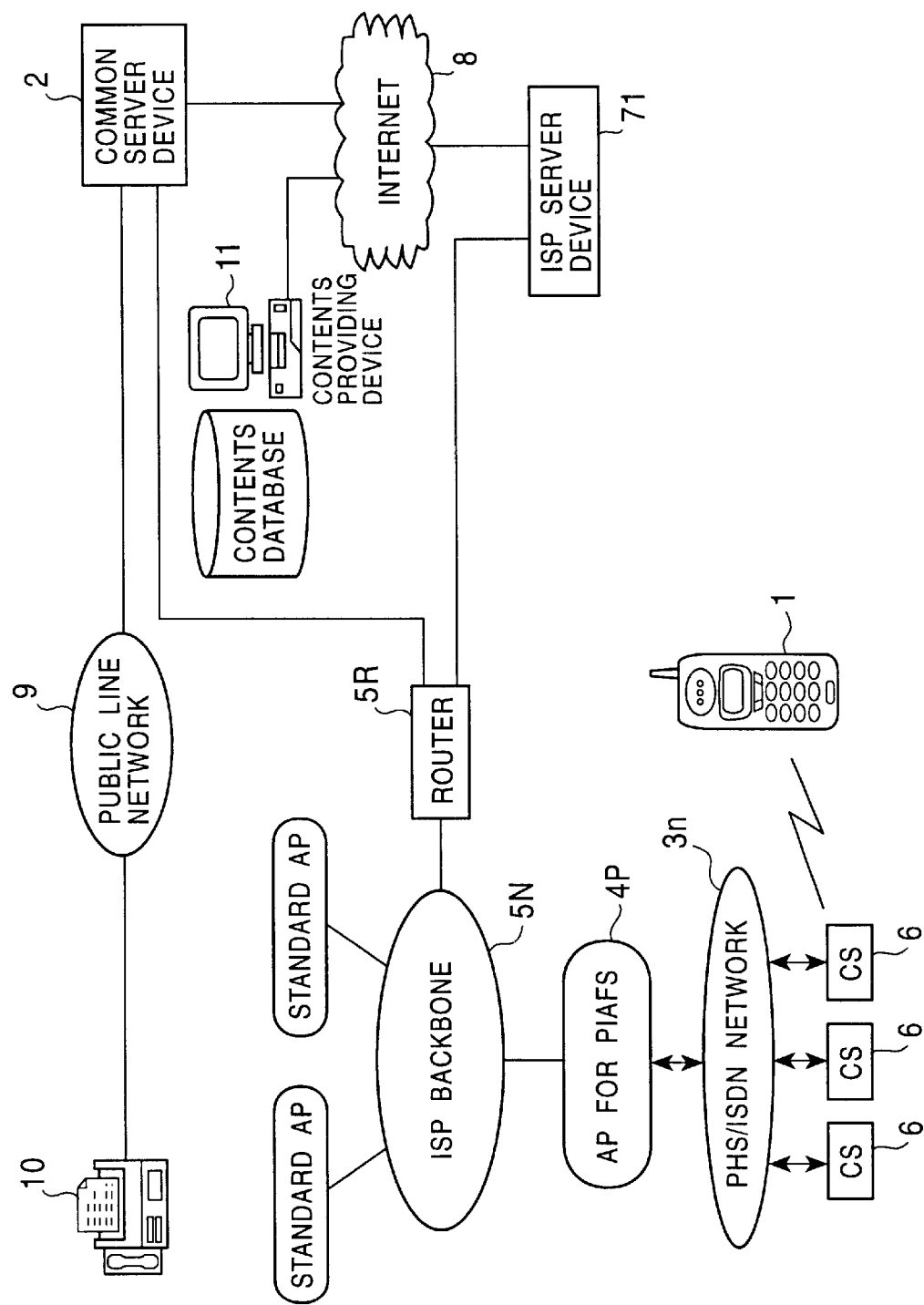
FIG. 2 is a diagram illustrating a specific example of network configuration of FIG. 1.

FIG. 2 is a more specific conceptual configuration of the communication network system shown in FIG. 1. In this case, the member terminal 1 has a configuration of being a multiplex device of a PHS telephone terminal and a PDA (Personal Digital Assistant) having data communication functions, and in addition to PHS telephone functions, has facsimile communication functions and electronic mail functions, and also has functions for receiving information services from the common server device 2, as described later.

The network 3 for portable wireless communication terminals to which the wireless base stations 6 are connected is a PHS/ISDN network 3n, in this example. Accordingly, the member terminal 1 can make telephone communication with another member terminal 1 or non-member PHS terminals via wireless base station 6—PHS/ISDN network 3n—wireless base station 6, and can make telephone communication with general subscriber telephone terminals via wireless base station 6—PHS/ISDN network 3n.

The dedicated trunk network 5 is a network under administration of an ISP (Internet Service Provider). In other words, 5N is the ISP backbone, i.e., a network such as a LAN, and this ISP backbone 5N and the PHS/ISDN network 3n are connected via a PHS 32 Kbit/second transfer speed Japanese industry-standard PIAFS (PHS Internet Access Forum Standard) access point 4P.

Also, 5N is the router for this ISP, connecting the ISP backbone 5N, the ISP server device 71 corresponding with the network administrating server device 7, and the common server device 2.

In the event that there is access from the member terminal 1, as described above, the ISP server device 71 makes verification thereof, being commissioned by the common server device 2. That is, as described above, the ISP server device 71 has registered therein member identification information of the member terminal 1 which accesses the common server device 2 via the ISP server device 71 e.g., member ID such as member No. and password, and in the event that there is access to a terminal connected to the ISP backbone 5N, the ISP server device 71 verifies whether or not the accessing terminal is a member terminal 1 which should be connected to the common server device 2 via the ISP backbone 5N, and in the event that it is a member terminal 1, the ISP server device 71 lets the member terminal 1 through to the common server device 2 via the router 5R.

Then, the ISP server device 71 sends the access history (log) of the member terminal 1 to the common server device 2. The common server device 2 receives the access history information for each of the plurality of member terminals from the ISP server device 71, and conducts administration of billing and so forth of the member terminal in an overall manner.

The contents providing device 11 in this example is connected to the common server device 2 via the Internet 8, so that the common server device 2 can obtain information to be provided from the contents providing device 11 via the Internet when necessary, thus providing this information to the member terminal 1. As described above, the contents providing device 11 need not be connected via the Internet 8; rather, arrangements may be made wherein the contents providing device 11 is connected with the common server device 2 via a dedicated line. Also, the ISP server device 71 may become a contents providing device.

Configuration of the Common Server Device

Figure 3:
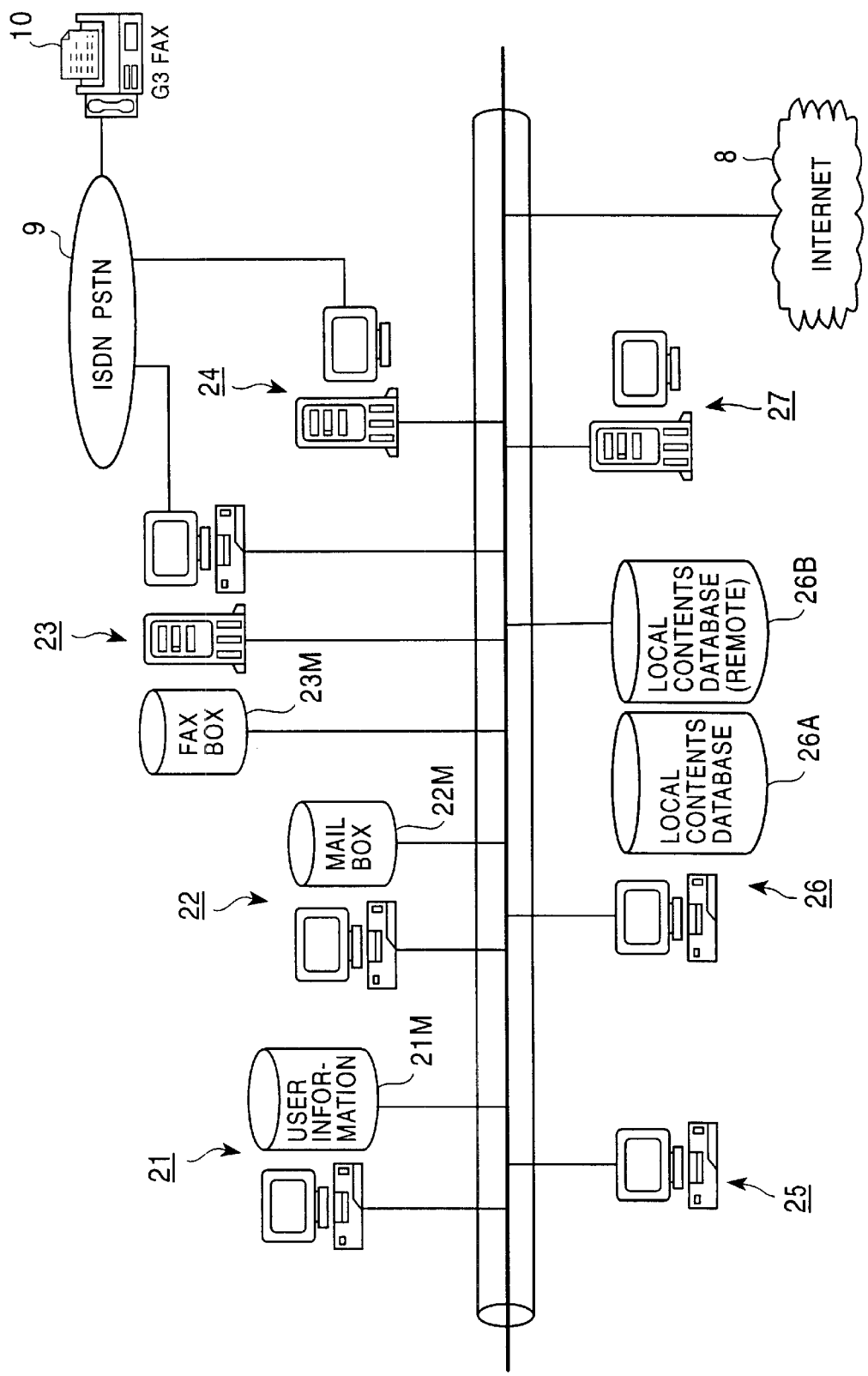
FIG. 3 is a block diagram illustrating an embodiment of the server device according to the present invention.

FIG. 3 is a block diagram illustrating an embodiment of the common server device 2. As shown in this FIG. 3, the common server device 2 is configured of a master server 21, a mail saver 22, a facsimile server 23, a reception notification server 24, an HTTP (Hyper Text Transfer Protocol) D server 25, a contents server 26, and a contents proxy server 27, these being connected by a LAN (Local Area Network). Also, this LAN is also connected to the Internet.

The master server 21 performs administration of member data, application for contents options and the like, membership cancellation processing, and administration maintenance of the entire network. The master server 21 has memory 21M which stores member data (user information).

In the present embodiment, a member data table shown in FIG. 4 is stored in the memory 21M of the master server. This member data table is formed of stored information about each member of the member terminals 1, such as member ID, password, name, address, date of birth, sex, occupation, city of employment, annual income, interests, etc.

In the event that this member information is to be generated at the time that purchasing of the portable wireless communication terminal as a member terminal 1 constitutes entering into contract with the common server device 2 as described above, the member information is collected from the user of the member terminal 1 who is the buyer at the time of purchasing the member terminal 1 by means of a questionnaire or the like, and is registered in the memory 21M as member information.

The member data table registered to the memory 21M of the master server 21 is used for targeting of the members to which to provide advertisement information according to instructions of the advertiser, as described later. Also, the member information is not restricted to that shown in FIG. 4, rather, various types of information may be collected and registered in the memory 21M as member information.

The mail server 22 mainly performs administration and operation of mail services, having POP (Post Office Protocol) or IMAP (Internet Message Access Protocol) server functions, and performs interface processing with the member terminal 1. The mail server 22 has memory 22M, which is referred to as member terminal mailbox. The mailbox 22M has a memory area which is partitioned for each of the member terminals 1, and stores the received data of electronic mail addressed to each of the member terminals, separately for each of the member terminals.

Incidentally, according to the present embodiment, as described later, facsimile data in the text data format which does not include image data which has been sent from one member terminal to another member terminal is also stored in the memory area in this mailbox 22M for the aforementioned other member terminal, as electronic mail data.

The facsimile server 23 executes an application with facsimile communication functions. The facsimile server 23 has mail server functions for interfacing with the member terminal 1, and also G3 facsimile PSTN (Public Switched Telephone Network) communication line functions, and is connected to an ISDN network 9. Also, the facsimile server 23 has memory 23M which is called facsimile box (hereafter referred to as "Fax box") for storing image data as facsimile data. The Fax box 23M also has a memory area which is partitioned for each of the member terminals, and stores the received facsimile data including image data addressed to each of the member terminals, separately for each of the member terminals 1.

The reception notification server 24 is for notifying the member terminal 1 via the ISDN line (ISDN network 9) in the event that electronic mail or facsimile addressed to the member terminal has arrived.

The HTTP D server 25 controls interfacing with the member terminal 1. In the event that the member terminal 1 is connected to the common server device 2, all processing is connected to each function server via this server 25.

The contents server 26 is a server for processing contents information to be provided by the common server device 2. This server 26 has two information storage memory banks, 26A and 26B, for the contents information to be provided. One of the memory banks 26A is for holding the information to be provided within this server 26 beforehand. The other memory bank 26B does not hold the information to be provided within this common server device 2, but is for temporarily storing data obtained from the contents providing device 11 via the Internet in the case of the present embodiment, at the time of usage thereof.

The contents proxy server 27 is used for obtaining contents data from the external contents providing device 11 via the Internet 8. The proxy server 27 creates an environment for freely accessing the outside from within a Firewall while preventing unauthorized access from outside, by means of functioning with the Firewall (not shown in the Figure).

Then, upon reception of a request from the member terminal 1 side accompanied by information indicating permission of attaching advertisements, the common server device 2 attaches advertisement information under management of the contents server 26 to the requested information, and thus provides the information to the member terminal 1. The advertisement information to be provided to the user of the member terminal 1 is managed as a part of this contents data.

About the Member Terminal 1

Next, description will be made regarding the member terminal 1. FIG. 5 is an example of the external view of a member terminal 1, and FIG. 6 is an example of an internal circuit configuration of this member terminal 1. As described above, the member terminal 1 has a multiplex terminal configuration, of PHS telephone functions, facsimile communication and electronic mail communication, and data communication functions for receiving information services.

Figure 5A:
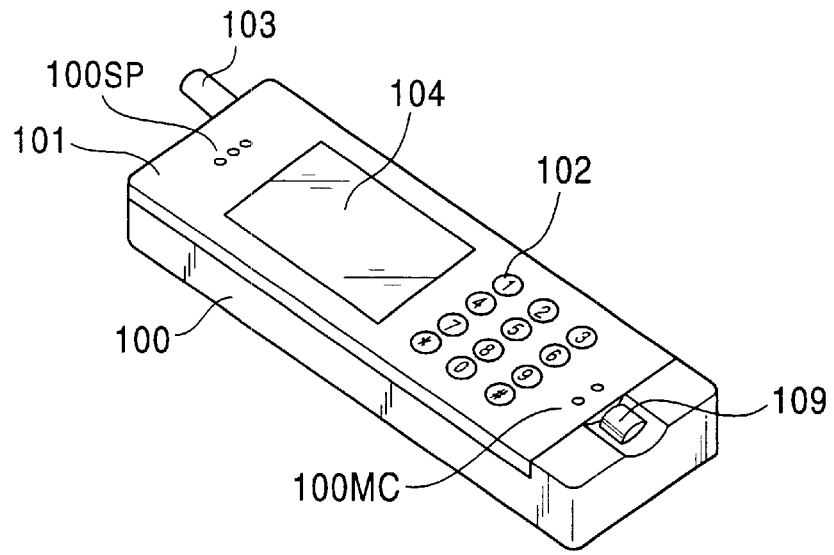
FIG. 5 is a block diagram illustrating the external view of an embodiment of the information communication terminal according to the present invention.
Figure 5B:
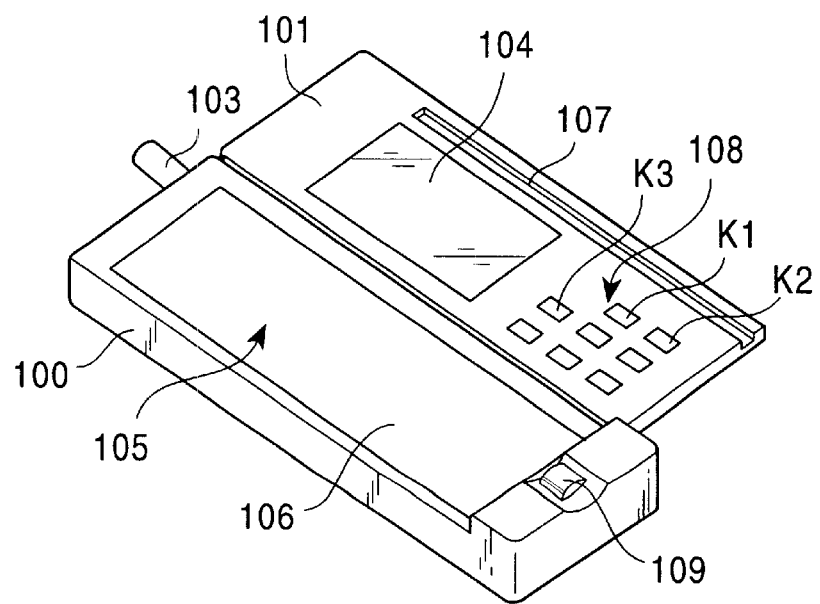

As shown in FIG. 5A and FIG. 5B, the member terminal 1 according to the present embodiment has a lid 101 which opens and closes from and to the terminal proper 100; in the state that this lid 101 is closed, as shown in FIG. 5A, the terminal is in the telephone mode wherein it operates as a PHS telephone terminal, in the state that this lid 101 is open, as shown in FIG. 5B, the terminal is in the data communication mode, in which facsimile communication, electronic mail communication, and information service receiving functions are available.

Although not shown in the Figures, a sensor for detecting the opening and closing of the lid 101 is provided for this mode switching.

As for this sensor, e.g., a protrusion is provided on the inner side of the lid 101, and a pressure-sensitive switch is provided on a corresponding position on the side of the main unit 100, thereby forming a mechanical sensor in which the pressure-sensitive switch on the main unit 100 is mechanically pressed by the aforementioned protrusion provided to the lid 101.

Also, a sensor switch may be used of a configuration such that a magnet is provided on one of the lid 101 or the main unit 100, and a switch comprised of a magnetism-sensitive device is provided on the other.

As shown in FIG. 5A, a numeric keypad 102 for telephone dialing is provided on the outside of the lid 101. 103 is a PHS antenna.

As shown in FIG. 5B, the member terminal 1 has a large-size LCD (Liquid Crystal Display) 105 on the surface of the main unit 100 which becomes apparent when the lid 101 is opened, this LCD 105 display surface capable of displaying communication text, function list menus, lists of information to be provided, lists of received facsimiles, electronic mail lists, etc. The arrangement is such that in the event that a menu or list cannot be displayed on one screen, the screen can be scrolled or switched to the next page to display all.

In the state wherein the lid 101 is closed, as shown in FIG. 5A, the display surface of the LCD 105 can be viewed through a LCD window 104 formed of a transparent plastic plate or the like. In this case, in the state that the lid 101 is closed, the LCD 105 display is controlled so that display is made only on the portion which can be viewed from the LCD window 104. The member terminal 1 according to the present embodiment is arranged such that a transparent touch-panel 106 is applied to the surface of the LCD 105, thereby allowing for functions of accepting touch operations or handwriting character input using a pen 107 detachably provided to the rear side of the lid 101 as shown in FIG. 5B.

Also provided to the rear side or the lid 101 are a plurality of key buttons 108, such as a menu key K1, online connection key K2, function key K3, and so forth. Further, to the right side of the LCD 105 is a jog dial key 109 having the two functions of serving as a rotating key and a push-button key. This jog dial key 109 is used such that rotating the jog dial key 109 allows for selection of items in a menu, and pressing as a push-button means input of deciding upon an item.

Next, description will be made regarding the circuit block of the member terminal 1 in FIG. 6.

The member terminal 1 in this example is comprised of two major portions, the communication function unit 110, and the control unit 120. The communication function unit 110 is comprised of an antenna 111, an RF processing unit 112, a transmission/reception data processing unit 113, a microphone amplifier 114, a speaker amplifier 115, a microphone 100MC, and a speaker 100SP.

The control unit 120 is comprised of a microcomputer, which has a system controlling unit 121 comprised of a CPU, ROM 122, DRAM 123, and flash memory 124 serving as non-volatile re-writable memory.

Connected to the system control unit 121 is a switch SW which turns on and off according to whether the lid 101 is open or closed, the system control unit 121 detecting whether the lid 101 is in an open state or a closed state by means of whether the switch SW is on or off. In the state that the lid 101 is closed, the system control unit 121 controls the member terminal 1 as a PHS telephone terminal. In the event that the lid 101 is in the open state, the system control unit 121 controls the member terminal 1 as an information communication terminal, facsimile communication terminal, or electronic mail communication terminal.

The system control unit 121 is arranged such that the state of the key switch group of the numeric keypad 102 or the key switch group of the key buttons 108 provided to the rear side of the lid 101 are input thereto, and in the event that the user operates keys, the system control unit 121 detects whether the numeric keypad 102 or the key buttons 108 have been operated, and executes processing according to the detected keys.

Also, an LCD driver 125 is connected to the system control unit 121, so as to display information provided from the common server device 2 or other display images on the LCD 105, using the later-described ROM 122 programs and display data.

Also connected to the system control unit 121 is a buzzer 127 or LED (Light-Emitting Diode) 126 for notifying the user of an incoming telephone call or arrival of a facsimile or mail.

The ROM 122 has stored therein a program for controlling the sequence for connection with the common server device 2, a control program for PHS telephone communication, a control program for sending facsimiles, a control program for sending mail, a control program for receiving facsimile data and mail data, and other such communication applications indispensable for communication using the member terminal 1, and programs for controlling the display of the LCD 105 and display data such as menus, etc.

As described later, the DRAM 123 temporarily stores received data obtained form the common server device 2, and also provides memory area to be used as a work area.

As described above, the flash memory 124 has stored therein beforehand an network address for the member terminal 1 to automatically access the common server device 2 via the ISP server device 7I. Also, stored within this flash memory 124 is member identification information such as member IDs and passwords (member identification information) for identifying that the member terminal 1 is a terminal which is in contract relation with the common server device 2 and is authorized to received facsimile service, electronic mail service, and information service from the common server device 2, and also for distinguishing the user of each member terminal.

Information relating to the member such as this member identification information is also stored in the main server 21 of the common server device 2 and is also under the administration of the common server device 2. The ISP server device 7I also performs verification of whether the accessing party is a member or not, using this member identification information.

Further, the flash memory 124 has an area for storing data which particularly should be saved of the received data temporarily stored in the DRAM 123, and an area for storing advertisement information sent from the common server device 2, as described later.

The operation of the member terminal 1 having a configuration such as described above will be described below, including the operations of the related common server device.

First, description will be made regarding the PHS telephone mode. In the state with the lid 101 closed, dialing the telephone number of another party executes an originating call. Also, in the event that there is an incoming telephone call to the member terminal 1 as a PHS telephone terminal in the state with the lid 101 closed, the user is notified by a buzzer 127, and the arriving call can be received by the user responding, thereby opening the call to both parties.

Incidentally, in the event that there is an incoming telephone call in the state with the lid 101 open, a talk key provided to the side of the main unit 100 but not shown in the Figures can be pressed to open the call at any time. However, the call is carried out with the lid 101 closed.

The terminal 1 is arranged such that in the case of PHS telephone conversation, the transmission/reception data processing unit 113 is controlled by the system control unit 121 to send transmitting signals, and also receive receiving signals.

That is to say, voice signals from the microphone 100 MC are provided to the transmission/reception data processing unit 113 via the amplifier 114 and converted into transmitting data, and is sent to a wireless base station 6 via the antenna 111, and at the same time voice signals from the other party are received from the wireless base station 6 via the RF processing unit 112 and the antenna 111, the received data is processed at the transmission/reception data processing unit 113 the communication voice signals of the other party are restored and provided to the speaker 100 SP via the amplifier 115, and thus cast as sound.

Next, description shall be made regarding the data communication mode. The member terminal 1 is configured such that in the communication mode, facsimile functions, electronic mail functions, WWW browser functions, memo functions, and so forth can be realized. A list menu of these functions is displayed on the screen of the LCD 105 by means of operating the menu key from the key buttons 108. The user selects and determines a desired function from the list menu of the functions displayed on the screen of the LCD 105 by means of rotating and pressing the jog dial key 109, and thereby the member terminal 1 enters a mode for executing that function.

Regarding the member terminal 1 in the present invention, sending or receiving of facsimile data, and sending or receiving of electronic mail is all processed via the common server device 2.

Regarding data exchange between the member terminal 1 and the common server device 2, a communication method is used which matches both the network 3 and network 5, regardless of the communication method stipulated for the facsimile communication method. That is, in the case of the present embodiment, facsimile data and electronic mail data use SMTP (Simple Mail Transfer Protocol) which is a standard protocol for transferring mail on the Internet. Also, information from the common server device 2 for the WWW browser functions uses HTTP (Hyper Text Transfer Protocol), and transmitting data and receiving data is exchanged between the member terminal 1 and the common server device 2 according to the PIAFS method, using the PHS network.

In this case, the transmitting data in the member terminal 1 is temporarily stored in the DRAM 123, read from the system control unit 121 by executing transmission, and sequentially subjected to wireless transmission according the aforementioned communication protocol and data format, via the transmission/reception data processing unit 113, RF processing unit 112, and antenna 111.

Also, the data received from the common server device 2 is received by the antenna 111, and is temporarily stored in the DRAM 123 by the system control unit 121, having passed through the RF processing unit 112 and transmission/reception data processing unit 113. This is then sent to the LCD 105 as display data via the LCD driver 125 by means of control by the system control unit 121, and the display contents of the received data are displayed.

There are two types of memo functions; "handwriting memo" wherein input is performed by using the pen 107 and touch panel 106, and "type memo" wherein a keyboard is displayed on the LCD 105 screen and text is created using the displayed keyboard. The arrangement is such that the created image or text can be sent as facsimile data, for either of the handwriting memo or type memo.

That is to say, in either case of handwriting memo or type memo, a menu bar including an icon for "FAX transmission (facsimile transmission" is displayed on the screen of the LCD 105, and selecting this "FAX transmission" icon with the pen, for example, brings up a input mode screen for inputting the telephone number of the other party terminal, facsimile title, and so forth. After inputting the telephone number of the other party terminal and the title, selecting the "send" icon displayed in this mode sends the handwritten memo or typed memo as a facsimile in the form of an image or facsimile data.

However, as described above, in this case, the facsimile data is sent to the common server device 2 as electronic mail data, so the image data and text data is not sent as facsimile communication bit-map data; rather, the image data is formatted as, e.g., GIF (Graphics Interchange Format) format, and the text data is sent in the text data format.

In the event that the destination is a non-member, the common server device 2 converts the received data into bit-map data, and sends the data as a facsimile to the non-member terminal. In the event that the destination is a member terminal 1, the common server device 2 stores the received data in the mailbox 22M or the FAX box 23M, and notifies the member terminal 1 via the reception notification server 24 that a message has arrived. This reception notification is performed not only for reception of facsimile data, but also for data reception of electronic mail.

At the time of selecting facsimile functions, the online connection key K2 of the key buttons 108 is pressed, whereby the member terminal 1 automatically executes processing for connecting to the common server device 2. That is to say, the member terminal 1 sends out a request for connecting to the common server device 2 according to address data in the flash memory 124. The ISP server 7I which is the network administrating server verifies whether or not the accessing terminal is a member terminal, and if this is a member terminal, the ISP server connects the member terminal to the common server device 2.

The common server device 2 identifies the connecting member terminal, and compiles a list of received facsimile data addressed to the member terminal, which is sent to the member terminal 1. Thus, in this example, the online connection key K2 also serves as a key for requesting a list of received information.

The member terminal 1 receives this list data from the common server device 2 and stores it temporarily in the DRAM 123, and displays the list on the screen of the LCD 105. The user of the member terminal 1 can select the desired received facsimile data from this list, using the jog dial key 106 or the pen 107. Selection of the desired received facsimile data is made, and selecting the "import" icon sends a request for obtaining the received data from the member terminal 1 to the common server device 2.

Upon receiving this request, the common server device 2 extracts the requested received facsimile data, and sends it to the member terminal by electronic mail SMTP. The member terminal 1 temporarily stores the received data in the DRAM 123, converts it into display data, and displays the data on the screen of the LCD 105. Accordingly, the user can select the necessary facsimile data and view it on the LCD 105 screen.

Also, in the event that the electronic mail function is selected, even when the online connection key K2 of the key buttons 108 is pressed, the member terminal 1 automatically executes processing for connecting to the common server device 2, the same as the case in which the facsimile function is selected. The common server device 2 creates a list of received electronic mail data and sends this to the member terminal 1.

The member terminal 1 receives the data of this list and displays this list on the screen of the LCD 105. The user can select the desired received electronic mail data from this list, using the jog dial key 109 or the pen 107. Selection of the desired received electronic mail data is made, and selecting the "import" icon sends a request for obtaining the received data from the member terminal 1 to the common server device 2.

Upon receiving this request, the common server device 2 extracts the requested received electronic mail data, and sends it to the member terminal by SMTP. The member terminal 1 temporarily stores the received data in the DRAM 123, converts it into display data, and displays the data on the screen of the LCD 105. Accordingly, the user can select the necessary electronic mail data and view it on the LCD 105 screen.

Also, in the present embodiment, in the event that WWW browser functions are selected from the function menu displayed on the display screen of the LCD 105, the member terminal 1 serves as an information reproducing terminal which is capable of obtaining information provided from the common server device 2 and reproducing this information. Exchange of data between the common server device 2 and the member terminal 1 is conducted using HTTP (Hyper Text Transfer Protocol) according to the PIAFS method, using the PHS network. The data format of the information provided from the common server device 2 is HTML (Hyper Text Markup Language).

Then, in the event that the WWW browser functions are selected, and the online connection key K2 of the key buttons 108 is pressed, the member terminal 1 automatically executes processing for connecting to the common server device 2, as with the case in which facsimile functions or electronic mail are selected. The common server device 2 sends to the member terminal 1 a so-called home page from the common server device 2 including a list of information which the common server device 2 can provide. Also, in this case as well, in the event that facsimile or electronic mail has arrived from the member which is the user of the member terminal 1 requesting contact, and the member has not yet been notified of such, a notification thereof is addressed and sent to the member via the member terminal 1.

The member terminal 1 receives and displays this homepage on the screen of the main LCD 105M. The user can select the desired contents information from this homepage, using the jog dial key 109 or the pen 107. Once selection of the desired contents is made, a request for obtaining the contents is sent from the member terminal 1 to the common server device 2.

Upon receiving this request, the common server device 2 extracts and sends the requested contents to the member terminal by HTTP. The member terminal 1 temporarily stores the received information in the DRAM 123, converts it into display data, and displays the data on the screen of the main LCD 105M.

Incidentally, in the present embodiment, facsimile data and electronic mail data is described as being sent and received between the member terminal 1 and the common server device 2 using SMTP, but the present invention is not restricted to such; rather, HTTP may be used to unify the communication protocol for sending and receiving information between the member terminal 1 and the common server device 2.

About Providing Advertisement Information

According to the information communication system according to the present embodiment, the common server device 2 provides advertisement information for corporations or the like to the member terminal 1, and the member terminal 1 receives advertisement information from the common server device 2 and regenerates it, thereby providing the advertisement information to the user of the member terminal 1.

In this case, the common server device 2 is arranged so as to be able to refer to the member data table stored in the memory 21M of the master server 21 in the common server device 2, and provide advertisement information only to members to which the advertiser desires to provide advertisement. In other words, the common server device 2 is capable of targeting the members to which to provide advertisement information, based on the member data table.

Then, the member terminal 1 stores the advertisement information from the common server device 2 in, e.g., the flash memory 124, and regenerates it at a predetermined timing, thereby providing the advertisement information to the user of the member terminal 1. In the present embodiment, as described below, in the event that the member terminal 1 is in the data communication mode, facsimile functions, electronic mail functions, or WWW browser functions are selected, the online connection key K2 is pressed, and advertisement information is displayed from the standby period from the time that the online connection request is sent to the time at which the communication channel is actually established with the common server device 2.

The advertisement information regenerated during the standby period is provided along with the so-called homepage which is the list of services which the common server device 2 can provide, this list being provided from the common server device 2 in the state that the member terminal 1 is in the data communication mode and is using the WWW browser functions.

In this embodiment, the memory 21M of the of the master server 21 of the common server device 2, for example, is provided with a plurality of advertisements with conditions for targeting the object, such as advertisement information for cosmetics aimed at users of member terminals 1 who are 25 years of age or older, or advertisements of a golf shop aimed at users of member terminals 1 whose interests include golfing.

The master server 21 of the common server device 2 makes reference to the member data table in the memory 21M, based on the member identification information included in the connection request information sent from the member terminal 1, and selects advertisement information for which the user of the member terminal 1 requesting connection is an object.

The common server device 2 attaches this selected advertisement information to the homepage which is a list as described above, and provides this to the member terminal 1 requesting connection.

In the member terminal 1 which receives homepage and advertisement information from the common server device 2, the homepage is written in the DRAM 123, converted into display data, and the homepage is displayed on the LCD 105, thus enabling selection input of the desired information service. On the other hand, the advertisement information is stored in the flash memory 124, to be regenerated during the next connection standby.

In other words, in order to execute the facsimile functions, electronic mail functions, and WWW browser functions which are executable in the data communication mode, as described above, pressing down the online connection key K2 generates connection request information, which is sent to the common server device 2, but this takes time for processing such as the verification which is performed at the ISP, and it takes from several seconds to several tens of seconds for a communication channel to be established between the common server device 2 and the member terminal 1.

At the member terminal 1, advertisement is regenerated during the connection standby until a communication channel is established with the common server device 2. That is to say, at the member terminal 1, when the system control unit 121 detects that the user of the member terminal 1 has pressed the online connection key K2, the advertisement information stored in the flash memory 124 is read by the system control unit 121, and this is displayed on the LCD 105.

In this case, The member terminal 1 and the common server device 2 are not yet connected, and data communication service is not yet carried out, so advertisement information can be displayed over the entirety of the LCD 105.

Then, in an example wherein the facsimile functions or the electronic mail functions are selected, and in the event that a communication channel is generated between the common server device 2 and the member terminal 1 which sent the connection request, which has been answered by the sending of a FAX list or an electronic mail list, the member terminal 1 erases the advertisement information which is being displayed, displays the FAX list or the electronic mail list which has been sent, thereby enabling selection input of the received facsimile data or the received electronic mail data which the user desires.

Also, in the event that the WWW browser function is selected, and in the event that a communication channel is generated between the common server device 2 and the member terminal 1 which sent the connection request, a homepage of a list of information services which can be provided is sent along with advertisement information of which the user of the member terminal 1 is the object, so the member terminal 1 erases the advertisement information which is being displayed, and displays the homepage of the common server device 2 which has been sent.

Also, the advertisement information which has been newly provided with the homepage takes the place of the advertisement information previously stored, and is stored in the flash memory 124, so the next time that the user presses the online connection request key and a connection standby state results, the an advertisement corresponding to the advertisement information newly stored in the flash memory 124 is displayed.

Thus, advertisement information for the user of the member terminal 1 which is in the standby state can be provided thereto. Also, the advertisement information stored in the flash memory 124 is, as described above, advertisement information regarding which the target has been narrowed, and advertisements can be provided to the target users of the member terminals 1 base on the member data table stored in the memory 21M, thus providing advertisements in an effective manner.

Second Embodiment

Next, a second embodiment according to the present invention shall be described. The second embodiment to be now described not only displays advertisement information during the standby time for generating a communication channel between the common server device 2 and the member terminal 1, but also newly obtains advertisement information of which the user of the member terminal 1 is the object, even during the time that the facsimile functions, electronic mail functions, or WWW browser functions are being used.

In the second embodiment, the information communication system described with reference to FIG. 1 through FIG. 6, and the configuration of the member terminal 1 and common server device 2 are not changed in any way; changing the software executed by the member terminal 1 and common server device 2 enables information to be provided to the user of the member terminal 1 even when not in connection standby.

The operation of the information communication system, the member terminal 1 which is a portable wireless communication terminal, and common server device 2, according to the second embodiment, shall be described with reference to the flowcharts shown in FIG. 7 through FIG. 10.

Providing advertisement information in the case that facsimile functions are in use.

FIG. 7 is a flowchart for describing the processing of the member terminal 1 in the event that the facsimile functions are selected when in the data communication mode.

At the member terminal 1, in the event that facsimile functions are selected from the function list menu displayed on the screen of the LCD 105 when in the data communication mode, and the online connection key K2 is pressed (step S1), the system controlling unit 121 generates connection request information using the address of the common service device 2 and the member identification information stored in the flash memory 124 (step S2), and sends this (step S3).

As described above, based on this information, the ISP server 71 which is the network administrating server verifies whether or not the accessing terminal is a member terminal 1, and if this is a member terminal 1, the ISP server connects the member terminal to the common server device 2. This connection process takes a certain amount of time, so the member terminal 1 is in a connection standby state, so as described above, advertisement information added to the homepage provided from the common server device 2 and stored in the flash memory 124 is displayed, in the event that the WWW browser functions are used (step S4).

Then, a communication channel is generated between the common server device 2 and the member terminal 1, and once the user of the member terminal 1 is confirmed as being a member based on the member identification information included in the connection request information from the member terminal 1, a FAX list and new advertisement information with this member as the object thereof are sent from the common server device 2.

In the second embodiment, the new advertisement information sent from the common server device 2 attached to the FAX list is provided added to the above homepage, is stored in the flash memory 124 of the member terminal 1, and is different from the advertisement information which is to be displayed during connection standby.

Then, the member terminal 1 receives the FAX list and advertisement information addressed to self (step S5), and displays the FAX list and advertisement information on the LCD 105 provided to this member terminal 1 (step S6). In this case, a display area is provided on the screen of the LCD 105 to display the advertisement information provided attached to the FAX list, and this advertisement information is displayed on the screen of the LCD 105 along with the FAX list. In this case, the display area for the advertisement information is an area to the upper side or lower side of the screen of the LCD 105, such that enables advertisement information to be displayed on the screen of the LCD 105 along with the FAX list.

In this case, the FAX list and the advertisement information can be individually scrolled and viewed, so the advertisement information does not get in the way.

Then, the system controlling unit 121 accepts selection input of the received facsimile data which the user is attempting to obtained from the displayed FAX list (step S6). As described above, in the event that the user selects the received facsimile data to be obtained by touching the touch panel 106 applied to the LCD 105 with the pen 107, a transmission request for the selected received facsimile data is generated (step S7), and this is sent (step S8).

Once the common server device 2 receives the transmission request of this received facsimile data, the common server device 2 obtains the selected received facsimile data from the facsimile server 23, and also obtains new advertisement information of which this user is the object, from the master server 21 for example, based on the member identification information included in the transmission request for the received facsimile data, and sends the requested received facsimile data and the advertisement information to the member which has made the request. In this second embodiment, the advertisement information provided by being attached to the received facsimile data is different from the advertisement information displayed during connection standby and from advertisement information displayed with the FAX list.

The member terminal 1 receives the received facsimile data and the advertisement information, and stores these in the DRAM 123 (step S9). The received facsimile data stored in the DRAM 123 is used to display the received facsimile data addressed to this member terminal 1 which has been requested from the common server device 2 on the LCD 105, and the advertisement information stored in the DRAM 123 is displayed on a display area on the LCD 105 in the same manner as the advertisement information provided attached to the aforementioned FAX list, thereby providing both the received facsimile data and the advertisement information to the user of the member terminal 1 at the same time (step S10).

Figure 8:
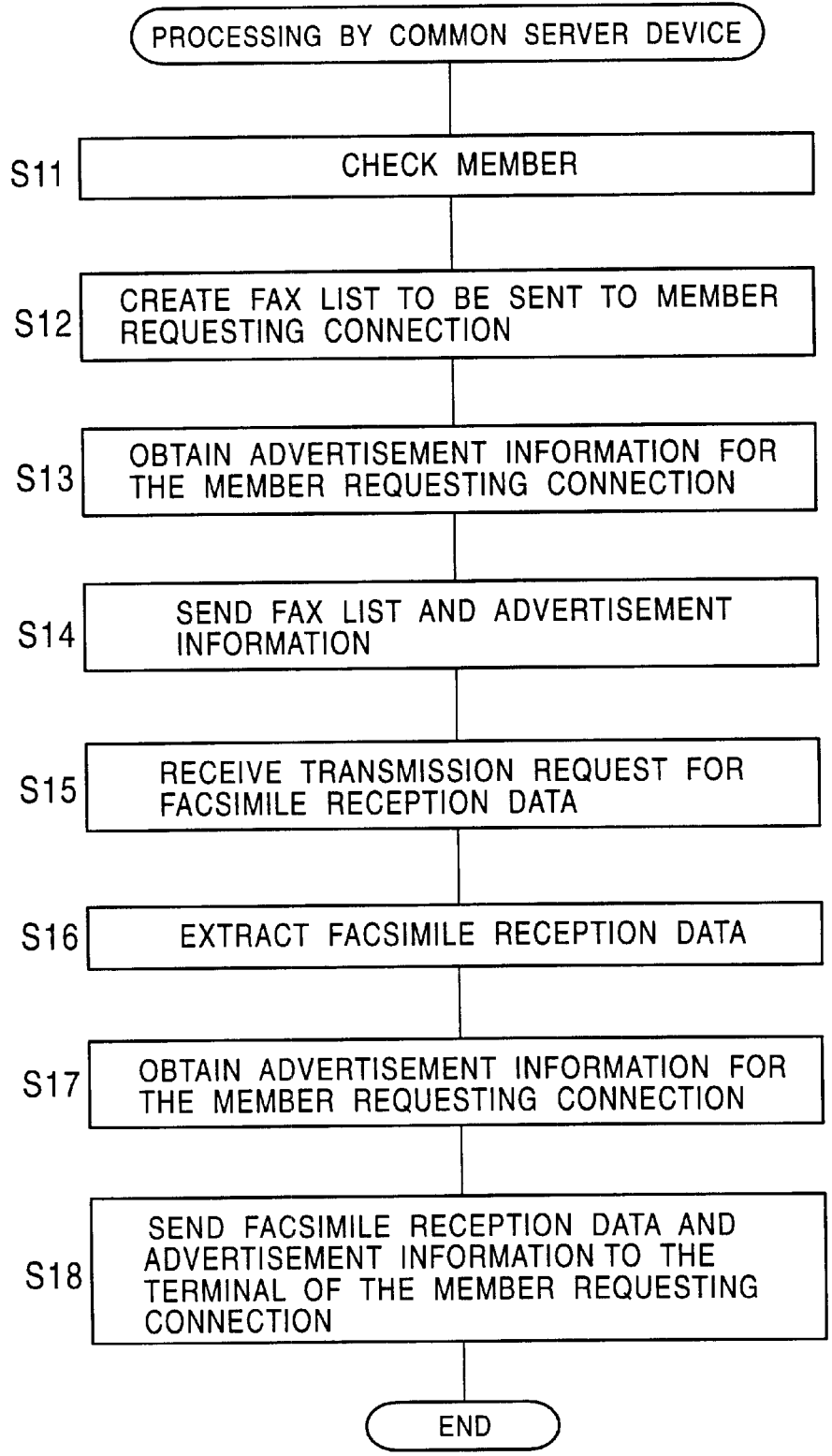
FIG. 8 is a flowchart illustrating the processing of the common server device in the case that facsimile communication functions are executed in an embodiment of the information communication system according to the present invention.

FIG. 8 is a flowchart describing the processing of the common server device 2 which is performed according to the connection request from the member terminal 1 on which the facsimile function is selected. In other words, the flowchart shown in FIG. 8 illustrates the processing of the common server device 2 performed in accordance with the processing or the member terminal 1 described with reference to FIG. 7.

Once connection request information is sent from the member terminal 1, as before, the ISP server 71 which is the network administrating server verifies whether or not the accessing terminal is a member terminal 1, and if this is a member terminal 1, the ISP server connects the member terminal 1 to the common server device 2.

At this time, the common server device 2 identifies the member terminal based on the member identification information included in the connection request information (step S11). Next, the common server device 2 creates a FAX list which is a list of received facsimile data addressed to the member which is the user of the member terminal 1 which has made the request for the connection (step S12), and also makes reference to the member data table stored in the memory 21M of the master server 21 and obtains the advertisement information of which the member is an object (step S13). Then, the common server device 2 sends the obtained advertisement information to the member terminal 1 along with the compiled FAX list (step S14).

Then, at the member terminal 1, received facsimile data requested to be sent based on the FAX list displayed on the LCD 105 is selected, and a request for sending the received facsimile data is formed and sent, in response to which the common server device 2 receives this transmission request for the received facsimile data (step S15), and extracts the requested received facsimile data (step S16).

Next, as with the case of the FAX list described above, advertisement information is obtained (step S17) which has the member as the object thereof, having made reference to the member data table which is stored in the memory 21M on the master server 21, based on the member identification information included in the transmission request for the received facsimile data. Then, the extracted received facsimile data and the advertisement information are sent to the member terminal 1 which has made the request (step S18).

Thus, the member terminal 1 can receive advertisement information along with the FAX list and received facsimile data, and regenerate the advertisement information along with the FAX list and received facsimile data and display it on the LCD 105, thereby providing it to the user of the member terminal 1.

In this case as well, the advertisement information is provided only to the member terminal 1 which matches the conditions specified by the advertiser, based on the information in the member data table which is referred to based on the member identification information, so the advertiser can provide advertisements in a more efficient manner. That is to say, the advertiser can more target the user of the member terminal 1 to receive the advertisement information, so advertisements specialized for the user of the member terminal 1 to receive the advertisement information can be created and provided thereto.

Also, advertisement information is not restricted only to during connection standby, and can be provided during displaying of FAX lists and received facsimile data, thus increasing opportunity for providing advertisement information.

Also, for example, as described above, the advertisement information can be changed according to whether during connection standby, displaying a FAX list, or during displaying received facsimile data, thus allowing providing of advertisement information of a wide variety, with differing contents and advertisers.

Also, from the perspective of the user of the member terminal 1, advertisements which have been targeted for the user according to the information in the member data table of the user can be obtained, so the user can obtain advertisement information which has a high probability of being information that the user needs. Also, facsimile communication and the like can be used at low costs, owing to advertisement information being added thereto.

Incidentally, though the above description indicated that advertisement information added to the homepage of the common server device 2 in the case of using the WWW browser functions, the advertisement information added to the FAX list, and the advertisement information added to the received facsimile data, are all different advertisement information, but there is no need that all be differing advertisement information. It is needless to say that the advertisement information generated at the respective timings may all be of the same content.

Also, an arrangement may be employed wherein advertisement information is regenerated and provided at all the following times: during connection standby, displaying a FAX list, or during displaying received facsimile data; or, an arrangement may be employed wherein the advertisement information is regenerated and provided only while displaying a FAX list, only during displaying received facsimile data, and so forth.

Incidentally, FIG. 7 and FIG. 8 illustrate a case wherein the member terminal has selected the facsimile functions, but the same can be carried out in the case of selecting the electronic mail functions, i.e., advertisement information of which the member which is the user of the member terminal 1 is the object can be added to an electronic mail list which is a list of electronic mail, or to received electronic mail data of which reception has been requested, based on the member data table.

Figure 9:
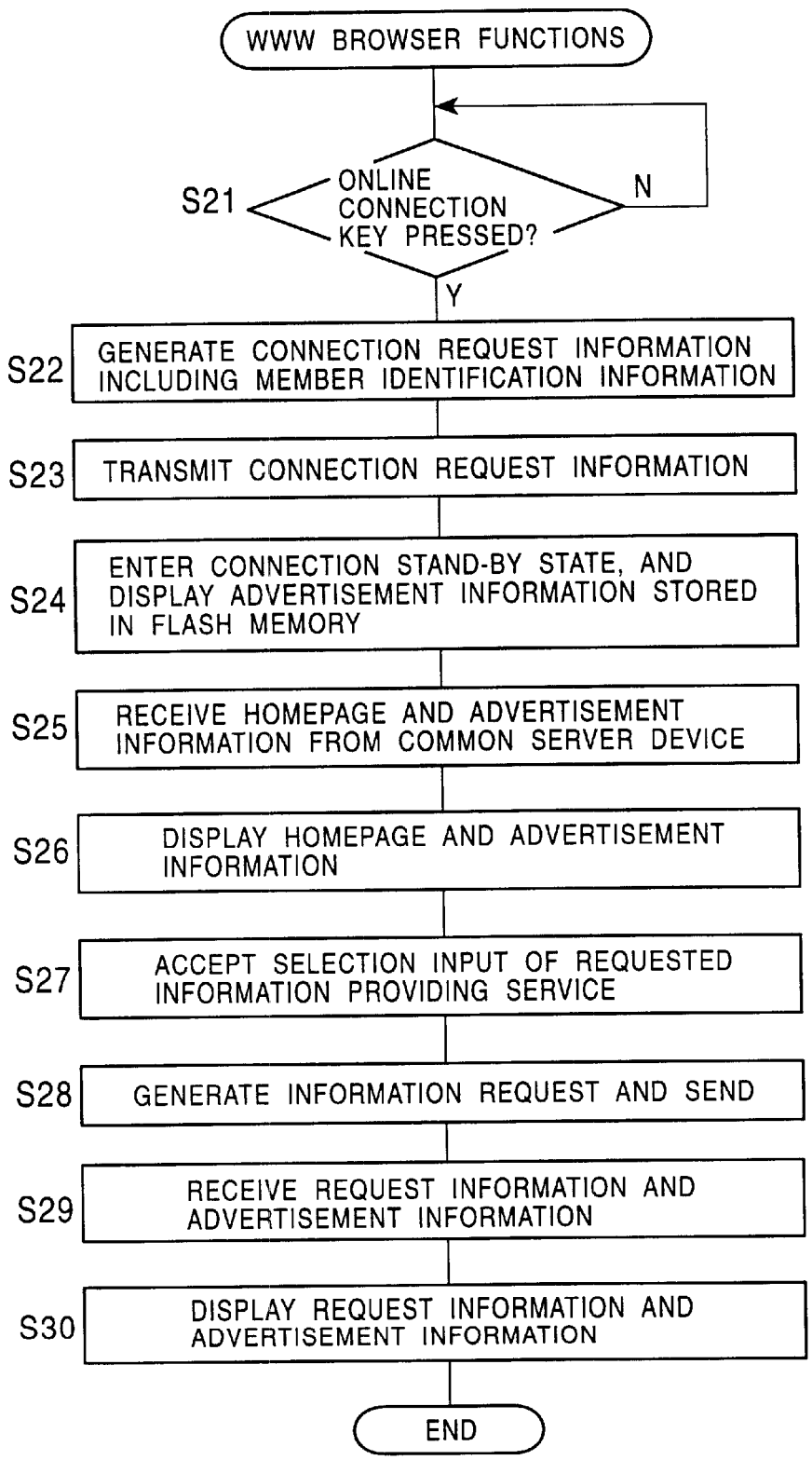
FIG. 9 is a flowchart illustrating the processing of the member terminal in the case that WWW browser functions are executed in an embodiment of the information communication system according to the present invention.

Providing Advertisement Information in the Case that WWW Browser Functions are in use Next, description will be made regarding the processing relating to providing advertising information at the time of carrying out information services performed by using the WWW browser functions. FIG. 9 is a flowchart for describing the processing of the member terminal 1 in the event that the WWW browser functions are selected when in the data communication mode.

At the member terminal 1, in the event that WWW browser functions are selected from the function list menu displayed on the screen of the LCD 105 when in the data communication mode, and the online connection key K2 is pressed (step S21), the member terminal 1 generates connection request information including member identification information as with the above-described facsimile functions and electronic mail functions (step S22), and sends this (step S23).

Then the member terminal 1 is in a connection standby state, so as described above, advertisement information added to the homepage provided from the common server device 2 and stored in the flash memory 124 is displayed, in the event that the WWW browser functions are used (step S24).

Then, a communication channel is generated between the common server device 2 and the member terminal 1 which sent the connection request information, and at the common server device 2, once the user of the member terminal 1 is confirmed as being a member based on the member identification information included in the connection request information from the member terminal 1, a homepage including a list of information services which can be provided, and new advertisement information with this member as the object thereof, are sent from the common server device 2.

The member terminal 1 receives the homepage and advertisement information (step S25) from the common server device 2, stores the homepage in the DRAM 123, stores the advertisement information in the flash memory 124, and displays the homepage stored in the DRAM 123 on the LCD 105 (step S26).

Then, selection input by the user of the member terminal 1 regarding the information service to be executed is accepted (step S27), an information request for receiving the selected information service is generated, and sent to the common server device 2 (step S28).

Once the common server device 2 receives the information request, the common server device 2 obtains the information to be provided according to the information request from memory 26A within itself or from an external contents providing device 11, and also obtains new advertisement information of which this user is the object, from the master server 21 for example, based on the member identification information included in the transmission request for the information, and sends the provided information and the advertisement information to the member terminal 1 which has made the request; based on the member data table stored in the memory 21M.

The member terminal 1 receives the provided information and the advertisement information sent form the common server device 2 (step S29), and displays these to the user on the LCD 105 (step S30). In this case, in the event that the aforementioned facsimile functions are selected, the advertisement information is displayed on a display area to the top or bottom of the LCD 105 in the same manner as the advertisement information provided attached to the aforementioned FAX list or received facsimile data, thereby providing both the provided information and the advertisement information at the same time (step S30), in this case as well.

Figure 10:
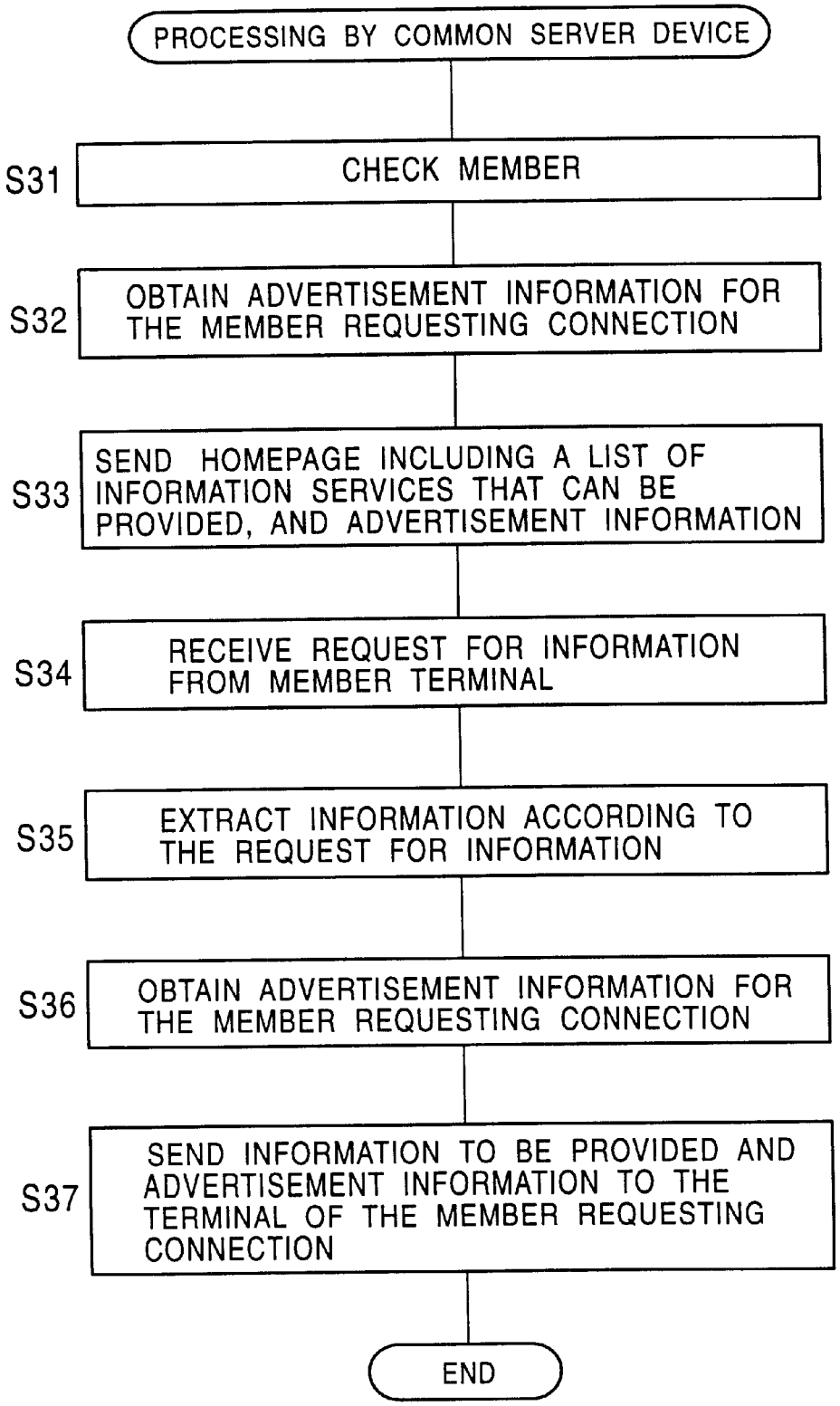
FIG. 10 is a flowchart illustrating the processing of the common server device in the case that WWW browser functions are executed in an embodiment of the information communication system according to the present invention.

FIG. 10 is a flowchart describing the processing of the common server device 2 which is performed according to the connection request from the member terminal 1 on which the WWW browser function is selected. In other words, the flowchart shown in FIG. 10 illustrates the processing of the common server device 2 performed in accordance with the processing or the member terminal 1 described with reference to FIG. 9.

Once connection request information is sent from the member terminal 1, as before, the ISP server 71 which is the network administrating server verifies whether or not the accessing terminal is a member terminal 1, and if this is a member terminal 1, the ISP server connects the member terminal 1 to the common server device 2.

The common server device 2 identifies the member terminal based on the member identification information included in the connection request information (step S31), and makes reference to the member.data table stored in the memory 21M of the master server 21 and obtains the advertisement information of which the member is an object, based on the homepage to be provided to the member terminal requesting the information, and member identification information included in the connection request information (step S32). Then, the common server device 2 sends the homepage and advertisement information to the member terminal 1 which has requested the information (step S33).

Then, at the member terminal 1, selection input for the information service is performed, and an information request for requesting the selected information service is formed and sent, in response to which the common server device 2 receives this information request (step S34), and obtains the information to be provided according to the information request, from memory 26A within itself or from an external contents providing device 11 (step S35). Further, advertisement information is obtained (step S36) which has the member which is the user of the member terminal 1 as the object thereof, having made reference to the member data table which is stored in the memory 21M on the master server 21, based on the member identification information included in the information request.

Then, the provided information and the advertisement information are sent to the member terminal 1 which has made the request (step S37).

In this way, in the case of the WWW browser functions as well, at the member terminal 1, advertisement information is received along with the requested information, and this advertisement information is regenerated and displayed on the LCD 105, thereby providing it to the user of the member terminal 1.

In other words, in the event that the WWW browser functions are to be used, the advertisement information stored in the flash memory 124 is displayed during connection standby, and the advertisement information provided with the information to be provided is displayed while the information is being displayed.

The advertisement information is provided to the member which is the user of the member terminal 1 which has made the request, based on the information in the member data table which is referred to based on the member identification information included in the request information from the member terminal 1, so the advertiser can provide advertisements in a more efficient manner, as described earlier.

Also, in the case of using the WWW browser functions, advertisement information can be displayed while displaying the provided information, thereby increasing opportunity for providing advertisement information.

Also, the advertisement information can be changed according to whether during connection standby, or displaying information, thus allowing providing of advertisement information of a wide variety, with differing contents and advertisers.

Also, from the perspective of the user of the member terminal 1, advertisements which have been targeted for the user according to the information in the member data table of the user can be obtained, so the user can obtain advertisement information which has a high probability of being information that the user needs. Also, facsimile communication and the like can be used at low costs, owing to advertisement information being added thereto.

Incidentally, though in the above embodiment the portable wireless communication terminal has been described as having PHS telephone capabilities, but a cellular telephone may be used for the telephone capabilities. In this case, a network for cellular telephone is used for the network.

Also, the information communication terminal according to the present invention is not restricted to a portable wireless communication terminal; rather, this may be a mobile personal computer connected with a telephone cable, or other communication terminals.

Also, the provided information is not restricted to image information; rather, this may be sound information, or both image and sound information.

Further, according to the above embodiment, the common server device 2 is described as having memory 26A for storing provided information, but this memory 26A is not necessarily required.

Also, an arrangement may be employed wherein whether or not to receive advertisement information is selected by the member who is the user of the member terminal 1. For example, information for no providing or advertising information is input before pressing the online connection key K2, so as to send the earlier-input information indicating that advertisement information is not to be provided, included in the request information sent from the member terminal 1 to the common server device 2.

Thus, the common server device 2 does not provide advertisement information to the member terminal which has specified that no advertisement information is to be provided. In this case, no advertisement information is provided, so FAX lists and received facsimile data, electronic mail lists and received electronic mail data, and provided information can be viewed without effects of advertisements.

Also, an arrangement may be employed wherein advertisement information is provided only during connection standby, and advertisement information is not displayed during displaying of FAX lists, received facsimile data, electronic mail lists, received electronic mail data, or provided information.

Also, information that is input at the member terminal 1 for preventing advertisement information from being provided may be stored in the flash memory 124 of the member terminal 1 as default setting information, and the information stored in this flash memory 124 may be included in the request information sent to the common server device 2.

Third Embodiment

Figure 11:
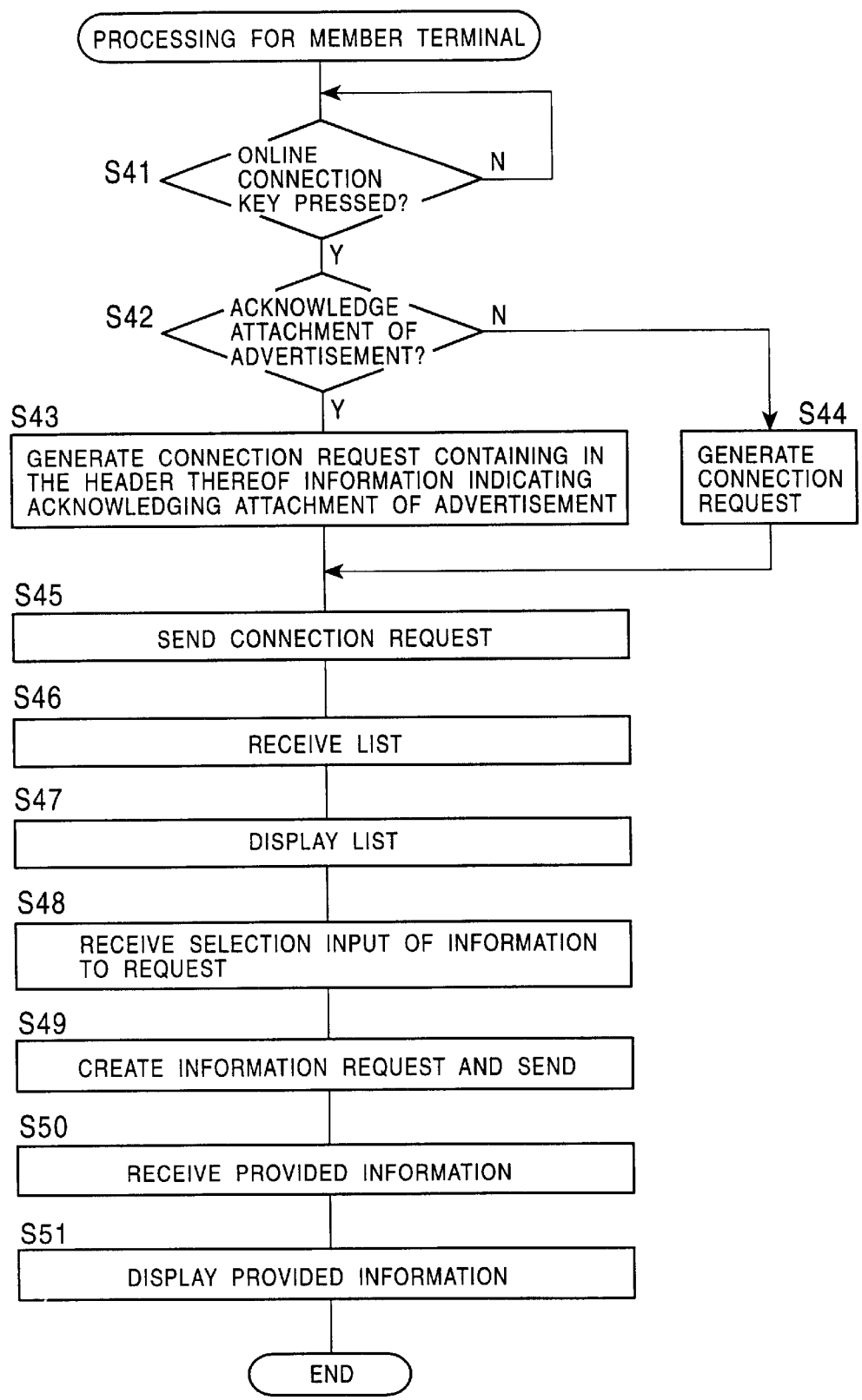
FIG. 11 is a flowchart for describing the operation of the information communication terminal in one embodiment of the information communication system according to the present invention.

FIG. 11 is a flowchart describing the operation of the member terminal 1 receiving information from the common server device 2 using the facsimile function, electronic mail function, and WWW browser function.

The lid 101 of the member terminal 1 is opened to the main unit 100 thereof, which places the device in the data communication mode, following which selection is made of one of the following: facsimile function with advertisements; the same without advertisements; electronic mail function with advertisements; the same without advertisements; WWW browser function with advertisements; or the same without advertisements. The online connection key is selected from the key buttons 108 (step S41), which causes the member terminal to automatically execute processing for connecting to the common server terminal 2.

According to the present embodiment, first, the user of the member terminal 1 judges whether or not attaching of advertisements to the information provided from the common server device 2 is permitted or not (step S42). More specifically, the judging process in step S42 is a process in which the user judges whether facsimile functions with attachment of advertisements, electronic mail functions with attachment of advertisements, or WWW browser functions with attachment of advertisements has been selected, or whether facsimile functions without attachment of advertisements, electronic mail functions without attachment of advertisements, or WWW browser functions without attachment of advertisements has been selected.

In the event that in the judging processing in step S42 the user of the member terminal 1 judges that attaching of advertisements is permitted, a connection request is generated in which indication of permission of attachment of advertisements is added to the extended header (step 43). In the event that in the judging processing in step S42 the user of the member terminal 1 judges that attaching of advertisements is not permitted, a connection request is generated in which no information regarding attachment of advertisements is added to the extended header (step S44).

In the steps S43 and S44, the connection request for connecting a communication channel with the common server device 2 is generated using the identification information (member identification information) of the member terminal 1 stored within the member terminal 1, and address data for connecting to the common server device 2 via the ISP server device 71.

Incidentally, in the present embodiment, as described above, only when attaching of advertisement is permitted is information included in the extended header of the connection request indicating that attaching of advertisement is permitted, and in the event that there is no information indicating that attaching of advertisement is permitted in the extended header, judgment is passed that attaching of advertisement is not permitted.

The connection information generated in step S43 or step S44 is output from the member terminal 1 (step S45). As before, the ISP server 71 which is the network administrating server verifies whether or not the accessing terminal is a member terminal using member identification information contained within the connection request of whether the terminal is a member terminal or not, and if this is a member terminal, the ISP server connects the member terminal to the common server device 2.

The common server device 2 receives the connection request from the member terminal 1 and identifies which member terminal the connected member terminal is, and sends to the member terminal 1 a list of received facsimile data, a list of received electronic mail data, or a list of contents information which can be provided to the member terminal 1, according to the function selected by the member terminal 1. In this case, in the event that the member terminal 1 which has sent the connection request is a member terminal which has permitted attaching of advertisements to the information to be provided, the common server device 2 provides to the member terminal 1 a list with advertisements attached thereto.

The member terminal 1 receives the list sent from the common server device 2 (step S46), and displays the received list on the LCD 105 (step S47). In the processing in this step S47, in the event that the user of the member terminal 1 has permitted attachment of advertisements to the information being provided from the common server device 2, a list is provided with advertisements attached thereto, so a list with advertisements attached thereto is displayed on the LCD 105.

Also, in the processing in this step S47, in the event that the user of the member terminal 1 has not permitted attachment of advertisements to the information being provided from the common server device 2, no advertisements are attached, only a list is provided, so the list is displayed over the entirety of the LCD 105.

Next, the member terminal 1 accepts selection input for information regarding which providing is requested by the user by means of the list (step S48). In other words, at the member terminal 1, in the event that the facsimile function is selected. The information regarding which providing is being requested is received facsimile data addressed to the member terminal 1; in the event that the electronic mail function is selected. The information regarding which providing is being requested is received electronic mail data addressed to the member terminal 1; and in the event that the WWW browser function is selected. The information regarding which providing is being requested is contents information which the common server 2 is capable of providing.

As described earlier, the user of the member terminal 1 either rotates and presses the jog dial key 109 or touches the touch panel 106 with the pen 107, thereby selecting information to request from the common server device 2, and the member terminal 1 accepts this.

Once the member terminal 1 accepts selection of the desired information from the user in step S48, a request for the selected information is generated and sent to the common server device 2 (step S49).

The common server device 2 receives the request for the selected information from the member terminal 1, analyzes what the requested information is, and extracts the information according to the request and sends it.

The member terminal 1 receives the information sent from the common server device 2 (step S50) and displays the received information in the LCD 105, thereby providing it to the user of the member terminal 1 (step S51).

In this case, in the event that the member terminal 1 is a member terminal which has permitted attaching of advertisements to the information provided from the common server device 2, the common server device 2 attaches advertisements to the information being provided according to the request of the member terminal 1, and so provided information with advertisement information attached thereto is displayed on the LCD 105.

Also, in the event that the member terminal 1 is a member terminal which has not permitted attaching of advertisements to the information provided from the common server device 2, the common server device 2 does not attach advertisements but sends only the information being provided, so the information provided from the common server device 2 is displayed over the entirety of the LCD 105 of the member terminal 1.

Figure 12:
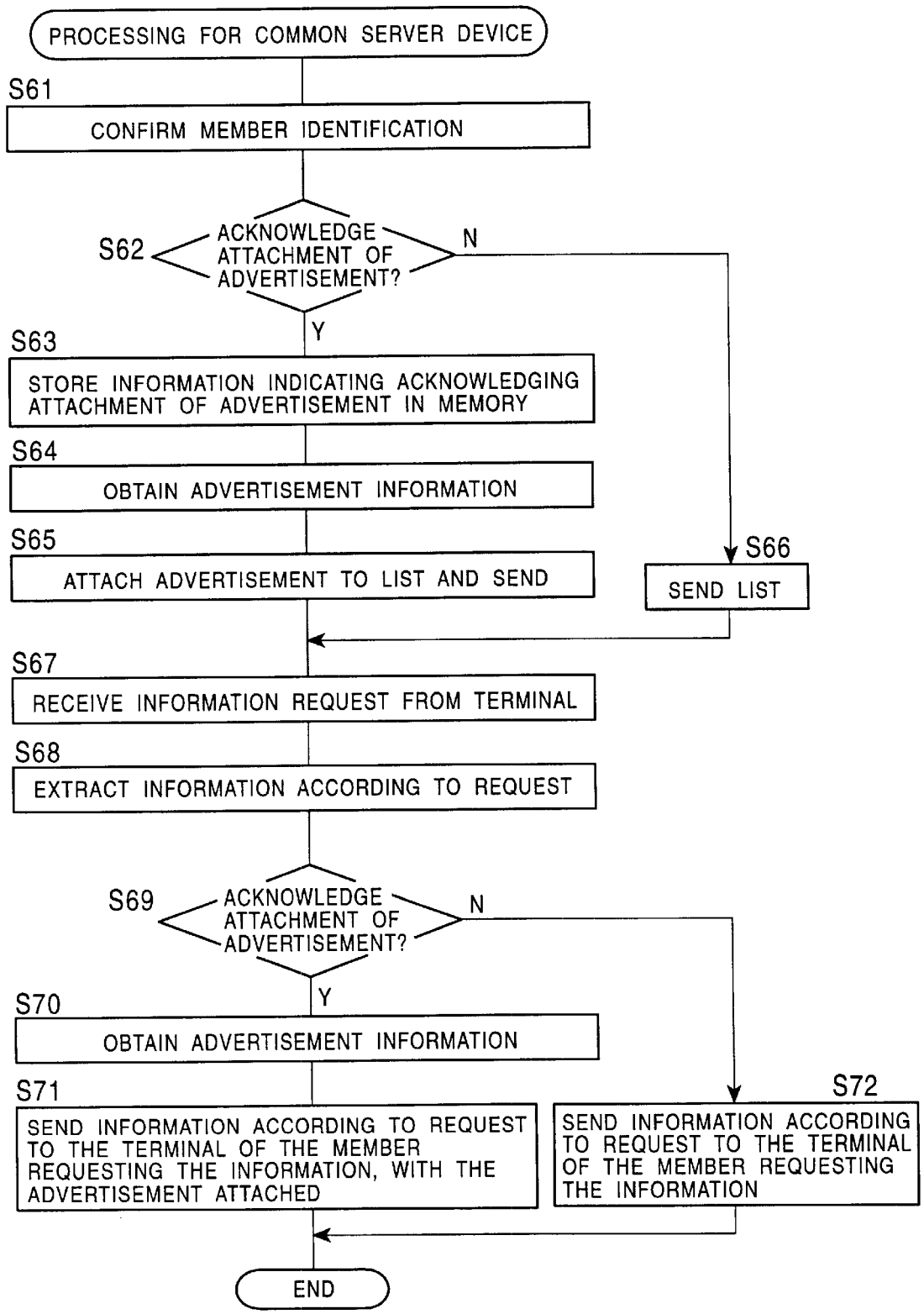
FIG. 12 is a flowchart for describing the operation of the server device in one embodiment of the information communication system according to the present invention.

FIG. 12 is a flowchart for describing the processing of the common service device performed in response to the connection request of the member terminal 1. In other words, the flowchart shown in FIG. 12 illustrates the processing of the common server device 2 performed in accordance with the processing or the member terminal 1 described with reference to FIG. 11.

Once a connection request is sent from the member terminal 1, as before, the ISP server 71 which is the network administrating server verifies whether or not the accessing terminal is a member terminal, and if this is a member terminal 1, the ISP server connects the member terminal 1 to the common server device 2.

The common server device 2 first identifies which member terminal the connected member terminal is based on the member identification information included in the connection request (step S61), and makes reference to the information in the extended header of the connection request from the member terminal 1, and judges whether or not attaching of advertisements to the information to be provided from the common server device 2 is permitted by the user of the member terminal 1 (step S62). That is to say, the judging process in this step S62 judges whether or not the member terminal 1 which has established a connected communication channel with the common server device 2 is a member terminal which has permitted attaching of advertisements to the information to be provided from the common server device 2.

In the event that judgment is passed in step S62 that the member terminal is a member terminal which has permitted attachment of advertisements, information is stored in memory within the common server device 2 indicating that the member terminal 1 has permitted attachment of advertisements to the information to be provided from the common server device 2 (step S63). This information is maintained until the communication channel established between the member terminal 1 and the common server device 2 in accordance with the connection request, is terminated.

Then, the common server device 2 obtains advertisement information stored within the common server device 2 (step S64), attaches the obtained advertisement information to the list to be provided to the member terminal 1, and sends this to the member terminal 1 which has requested the connection (step S65).

In the judging process of step S32, in the event that judgment is passed that the member terminal 1 has not permitted advertisements to be attached to the information provided form the common server 2, no advertisements are obtained and attached, and only the list is sent to the member terminal 1 which has requested the connection (step S66).

Then, at the member terminal 1, selection input of the information to be requested is performed, and once the information request for requesting the selected information is formed and sent, the common server device 2 receives the information request (step S67) and obtains the information according to the information request (step S68).

Then, as described above, the common server device 2 judges whether or not the member terminal 1 which has requested providing of information is a member terminal which has permitted attaching of advertisement information to the information provided from the common server device 2, based on the information stored in own memory by the process performed in step S63 (step S69).

In the event that the common server device 2 judges that the member terminal 1 which has requested providing of information is a member terminal which has permitted attaching of advertisement information to the information provided from the common server device 2, based on the process performed in step S69, the common server device 2 obtains advertisement information to attach to the provided information (step S70), and attaches the advertisement information obtained in step S70 to the extracted information and sends this to the member terminal 1 which has made the request (step S71).

In the event that the common server device 2 judges that the member terminal 1 which has requested providing of information is a member terminal which has not permitted attaching of advertisement information to the information provided from the common server device 2, in the process performed in step S69, the common server device 2 sends only the information extracted in step S68 and to the member terminal 1 which has made the request, without advertisement information (step S72).

In this way, the user of the member terminal 1 is capable of making selection of whether or not to permit attaching of advertisement information to the information provided from the common server device 2. The selection information regarding whether or not to permit attaching of advertisement information to the information provided from the common server device 2 is notified to the common server device 2, and the common server device 2 attaches advertisements only to the information to be provided to the member terminals which have permitted advertisements to be attached thereto.

Accordingly, the user of the member terminal 1 can freely select whether or not to permit attaching of advertisement information to the information provided from the common server device 2, according to, e.g., the contents of the information to be received or personal preference. For example, in the event of receiving personally important information from the common server device 2, the user can set up such that attachment of advertisements is not permitted, thereby receiving only the desired information from the common server device 2, and displaying and viewing the desired information on the entire screen of the LCD.

Also, in the event of permitting attachment of advertisements to the information provided from the common server device 2, as described above, the information can be received at a lower cost due to the advertisements added to the information.

Fourth Embodiment

The above-described embodiment is such wherein in the case of permitting attaching of advertisement information to the information provided from the common server device 2, information is included in the extended header of the connection request sent from the member terminal 1 indicating that attaching of advertisement is permitted and is sent, thereby permitting attaching of advertisement information to the information provided from the common server device 2 via the communication channel connected according to the connection request.

However, whether or not to permit adding of advertisements may differ according to the contents of the information regarding which providing thereof is requested from the common server device 2, from one piece of requested information to another. Accordingly, e.g., in the event of selecting the received facsimile data which is the object of the user of the member terminal 1 from the received facsimile data list, it would be handy to be able to select whether or not to permit attaching of advertisement data for each piece of received facsimile data.

This is equally advantageous in the case of selecting desired received electronic mail data from a list of received electronic mail data and requesting it, or in the case of selecting desired information from a list of contents information which the common server device 2 can provide and requesting it.

Figure 13:
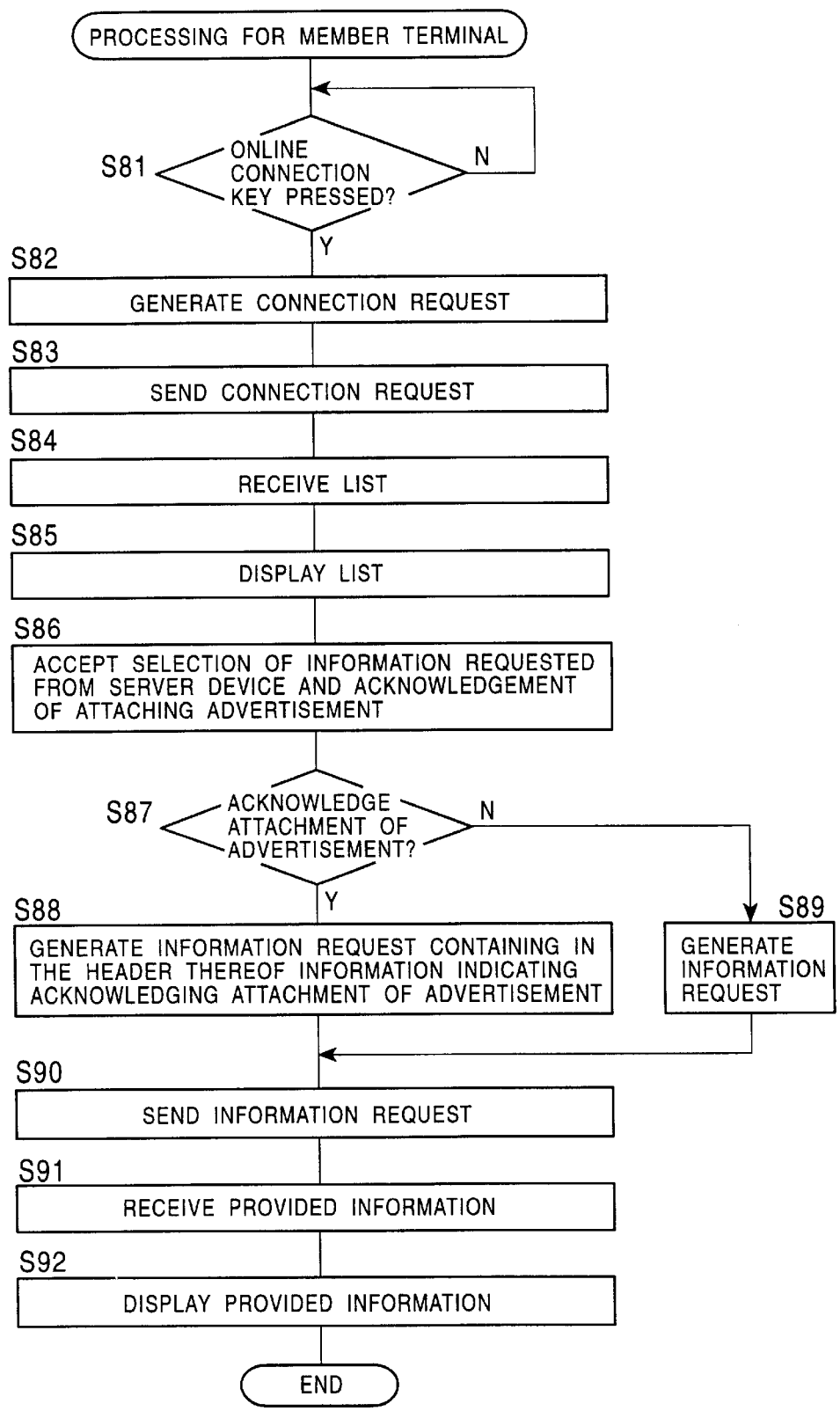
FIG. 13 is a flowchart for describing the operation of the information communication terminal in another embodiment of the information communication system according to the present invention.
Figure 14:
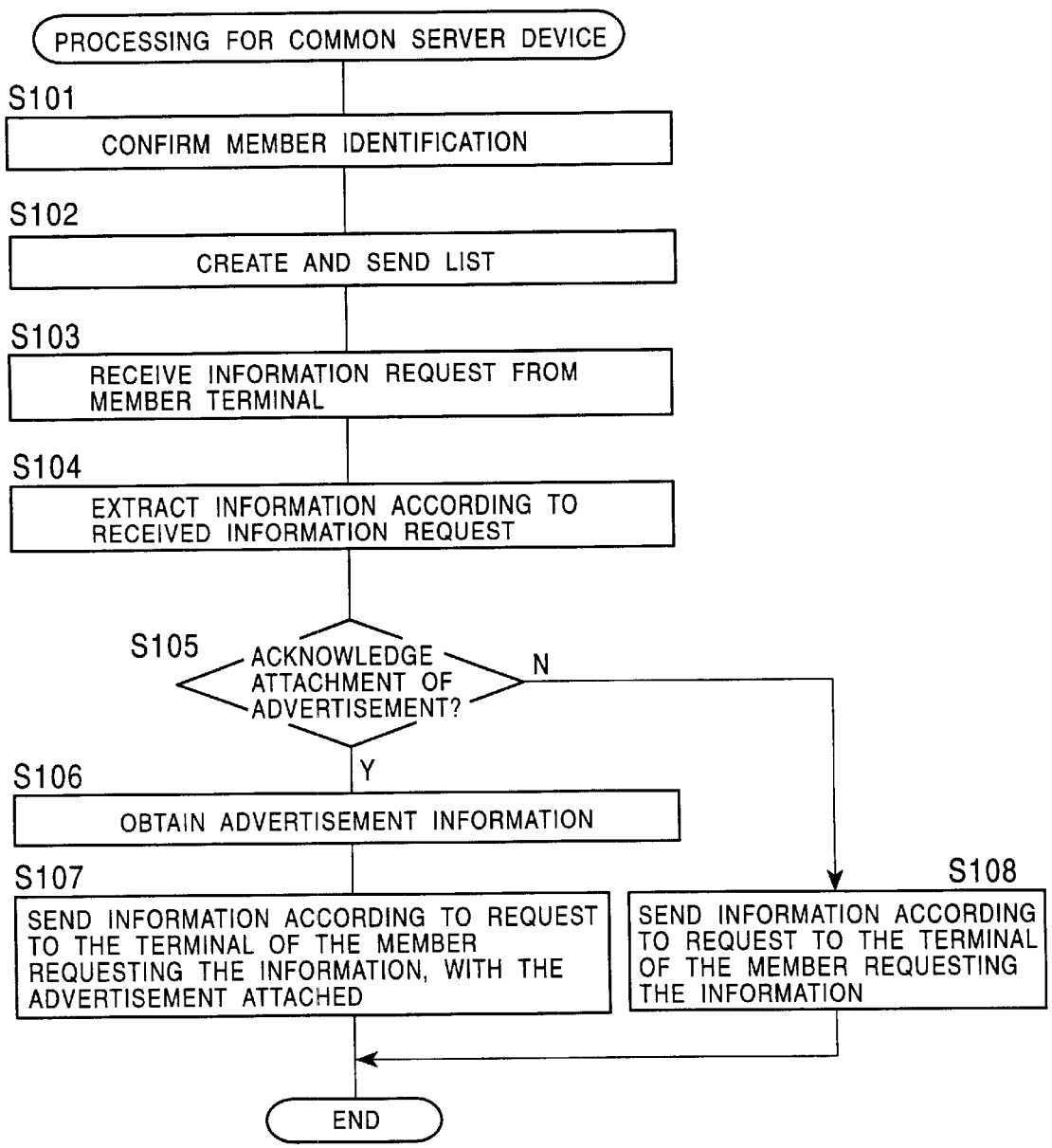
FIG. 14 is a flowchart for describing the operation of the server device in another embodiment of the information communication system according to the present invention.

Accordingly, the following is a description of the operation of the member terminal 1 and the operation of the common server device 2 in an information communication system which is arranged such that the member terminal 1 is capable of selecting whether or not to permit attachment of advertisements to each piece of information received from the common server device 2, with reference to the flowcharts shown in FIG. 13 and FIG. 14.

The member terminal 1 and the common server device 2 described below are configured in the same manner as the member terminal 1 and the common server device 2 of the information communication system described with reference to FIG. 1 through FIG. 5, but as shown in FIG. 13 and FIG. 14, the software executed by the member terminal 1 and the common server device 2 is different to that of the member terminal 1 and the common server device 2 of the above-described embodiment.

That is to say, the member terminal 1 in the present embodiment is not arranged for selection of facsimile function with advertisements, the same without advertisements, electronic mail function with advertisements, the same without advertisements, WWW browser function with advertisements, or the same without advertisements; rather attachment or non-attachment of advertisement for each piece of information requested from the common server device 2 can be made.

FIG. 13 is a flowchart describing the operation of the member terminal 1 receiving information from the common server device 2 using the facsimile function, electronic mail function, and WWW browser function.

The lid 101 of the member terminal 1 is opened to the main unit 100 thereof, which places the device in the data communication mode, following which selection is made of one of the following: facsimile function, electronic mail function, or WWW browser function. The online connection key K2 is selected from the key buttons 108 (step S81), which causes the member terminal to automatically execute processing for connecting to the common server terminal 2. That is to say, the member terminal 1 generates a connection request for connecting a communication channel with the common server device 2 (step S82), using the identification information (member identification information) of the member terminal 1 stored within the member terminal 1, and address data for connecting to the common server device 2 via the ISP server device 71, and this is sent (step S83).

Again, once the connection request is sent from the member terminal 1, the ISP server 71 which is the network administrating server verifies whether or not the accessing terminal is a member terminal, and if this is a member terminal 1, the ISP server connects the member terminal 1 to the common server device 2.

The common server device 2 receives the connection request from the member terminal 1 and identifies which member terminal the connected member terminal is, and according to the functions selected by the member terminal 1, provides the member terminal 1 with a list of received facsimile data to be provided to the member terminal 1, a list of member terminal 1 to be provided to the member terminal 1, or contents information which can be provided.

The member terminal 1 receives the list sent from the common server device 2 (step S84) and displays the received list on the LCD 105 (step S85). Next, the member terminal 1 accepts input of information to be provided from the list by the user (step S86).

In other words, at the member terminal 1, in the event that the facsimile function is selected. The information regarding which providing is being requested is received facsimile data addressed to the member terminal 1; in the event that the electronic mail function is selected, the information regarding which providing is being requested is received electronic mail data addressed to the member terminal 1; and in the event that the WWW browser function is selected. The information regarding which providing is being requested is contents information which the common server 2 is capable of providing.

Then, in the processing of this step S86, the user of the member terminal 1 either rotates and presses the jog dial key 109 or touches the touch panel 106 with the pen 107, thereby selecting information to request from the common server device 2.

According to this fourth embodiment, in step S86, not only is selection of information to request performed, but selection input of whether or not to permit addition of advertisements to the selected information is performed, as well. In other worlds, each item comprising each list has information specifying whether or not to attach advertisements.

For example, in the case of a received facsimile data list, in addition to information such as the date and time of reception and the fax number of the other party, an area is provided to specify whether or not to attach advertisements, for each item corresponding to each piece of received facsimile data comprising the list, so that whether or not to attach advertisements can be specified for each piece of information in the event of selecting information to request from the common server device 2.

Then, the information selected to request from the common server device 2 is judged whether or not attachment of advertisement has been permitted, i.e., whether advertisements attached has been selected or whether no advertisements attached has been selected (step S87).

In the event that judgment is made in the judging process of step S87 that attachment of advertisements has been permitted (advertisements attached has been selected), an information request is generated including in the header thereof indication that attachment of advertisements has been permitted (step S88).

In the event that judgment is made in the judging process of step S87 that attachment of advertisements has not been permitted (no advertisements attached has been selected), an information request is generated without including in the header thereof information regarding advertisements (step S89).

Then, the information request generated in step S87 or step S88 is sent to the common server device 2 (step S90).

The common server device 2 receives the request for the selected information from the member terminal 1, analyzes what the requested information is, and extracts the information according to the request and sends it.

The member terminal 1 receives the information sent from the common server device 2 (step S91) and displays the received information in the LCD 105, thereby providing it to the user of the member terminal 1 (step S92).

In this case, in the event that the member terminal 1 has permitted attaching of advertisements to the information requested from the common server device 2, such is included in the extended header of the information request, so the common server device 2 attaches advertisements to the information being provided according to the request of the member terminal 1, and so provided information with advertisement information attached thereto is displayed on the LCD 105 of the member terminal 1.

Also, in the event that the member terminal 1 has not permitted attaching of advertisements to the information provided from the common server device 2, the common server device 2 does not attach advertisements but sends only the information being provided, so the information provided from the common server device 2 is displayed over the entirety of the LCD 105 of the member terminal 1.

FIG. 14 is a flowchart for describing the processing of the common service device performed in response to the connection request of the member terminal 1. In other words, the flowchart shown in FIG. 14 illustrates the processing of the common server device 2 performed in accordance with the processing or the member terminal 1 described with reference to FIG. 13.

Once a connection request is sent from the member terminal 1, as before, the ISP server 71 which is the network administrating server verifies whether or not the accessing terminal is a member terminal, and if this is a member terminal 1, the ISP server connects the member terminal 1 to the common server device 2.

Then, the common server device 2 first identifies which member terminal the connected member terminal is, based on the member identification information included in the connection request (step S101), compiles a list to be provided to the member terminal 1, and sends this to the member terminal 1 which has requested connection (step S102).

Then, at the member terminal 1, selection input of the information to be requested is performed, and once the information request for requesting the selected information is formed and sent, the common server device 2 receives the information request (step S103) and extracts the information according to the information request (step S104).

Then, the common server device 2 makes reference to the information in the extended header of the connection request from the member terminal 1, and judges whether or not attaching of advertisements to the information to be provided from the common server device 2 is permitted (step S105).

In the event that judgment is passed that the member terminal has permitted attachment of advertisement information, based on the process performed in step S105, the common server device 2 obtains advertisement information to attach to the provided information (step S106), and attaches the advertisement information extracted in step S104 to the information obtained in step S106 and sends this to the member terminal 1 which has made the request (step S107).

In the event that the common server device 2 judges that the member terminal 1 which has requested providing of information has not permitted attaching of advertisement information, in the process performed in step S105, the common server device 2 sends only the information extracted in step S104 to the member terminal 1 which has made the request, without attaching advertisement information (step S108).

In this way, according to the fourth embodiment, the user or the member terminal 1 can select whether or not to attach advertisements to information requested from the common server device 2, each time requesting information therefrom.

In this case, the user can set up such that there are no advertisements attached to the information being provided from the common server device 2, by means of not permitting attaching of advertisements, thereby viewing only the desired information.

Conversely, in the event that the user judges that the information is such that there is no particular problem having advertisements attached thereto, the user can permit attaching of advertisements so that information is provided with advertisements attached thereto, allowing the user to receive information at low cost.

Now, in the above embodiment, the arrangement is such that only in the event that attachment of advertisements is permitted by the user of the member terminal 1, information indicating permission of attaching advertisements to the requested information is included in the extended header of the connection request sent from the member terminal 1 or the extended header of the information request sent from the member terminal 1, and such that in the event that attachment of advertisements is not permitted by the user of the member terminal 1, information relating to permission of attaching advertisements is not included. In this case, the common server device 2 can judge whether or not the user of the member terminal 1 has permitted attaching of advertisements, by judging whether or not there is information in the aforementioned extended header indicating that attaching of advertisements has been permitted.

However, the present invention is not restricted to such an arrangement; rather an arrangement may be employed wherein in the event that attachment of advertisements is permitted, information indicating permission of attaching advertisements to the requested information is included in the extended header of the connection request sent from the member terminal 1 or the extended header of the information request sent from the member terminal 1, and such that in the event that attachment of advertisements is not permitted, information indicating no permission of attaching advertisements to the requested information is included.

In this case, the common server device 2 can judge which way the user of the member terminal 1 has selected regarding attaching of advertisements, by judging whether there is information in the aforementioned extended header indicating that attaching of advertisements has been permitted or whether there is information indicating that attaching of advertisements has not been permitted.

Also, an arrangement may be employed wherein selection information is included in the connection request from the member terminal 1 whether or not to permit attachment of advertisements to received facsimile data lists, received electronic mail data lists, and lists of contents information that can be provided, and wherein information is included in the information request regarding whether or not to permit attachment of information for each piece of information for which providing is being requested.

Also, the arrangement in the above-described first embodiment is such that selection is made from the function list between, e.g., facsimile functions with advertisements attached or facsimile functions with advertisements not attached, thereby facilitating selection of whether or not to permit attachment of advertisements to the information obtained by the function being executed, but the present invention is not restricted to such an arrangement.

For example, an arrangement may be made wherein the member terminal 1 is provided with an "advertisements attached" online connection key and an "advertisements not attached" online connection key, thereby facilitating selection of whether or not to permit attaching of advertisements by using these two keys. In essence, any arrangement is agreeable so long as the user of the member terminal 1 is capable of performing selection input whether or not to permit attaching of advertisements, and selection information corresponding with the selection input is notified to the common server device 2.

In the same way, regarding the fourth embodiment, any arrangement is agreeable so long as the user of the member terminal 1 is capable of performing selection input whether or not to permit attaching of advertisements each time requesting providing of information, and selection information corresponding with the selection input is notified to the common server device 2.

Other Example of Transmitting Procedures

Next, another example of load-sharing of processing between the member terminal 1 and the common server device 2 regarding the transmitting processing procedures will be described with reference to the flowcharts shown in FIG. 15 through FIG. 17, considering an example of facsimile transmission.

First, facsimile transmission from the member terminal 1 will be described with reference to the flowcharts shown in FIG. 15 through FIG. 17. In this case, FIG. 15 represents the flow of operations at the member terminal 1. FIG. 16 and FIG. 17 represent the flow of processing action at the common server device 2, FIG. 16 being the flow of processing action at the mail server 22 of the common server device 2, and FIG. 17 being the flow of processing action at the facsimile server 23 of the common server device 2.

Figure 15:
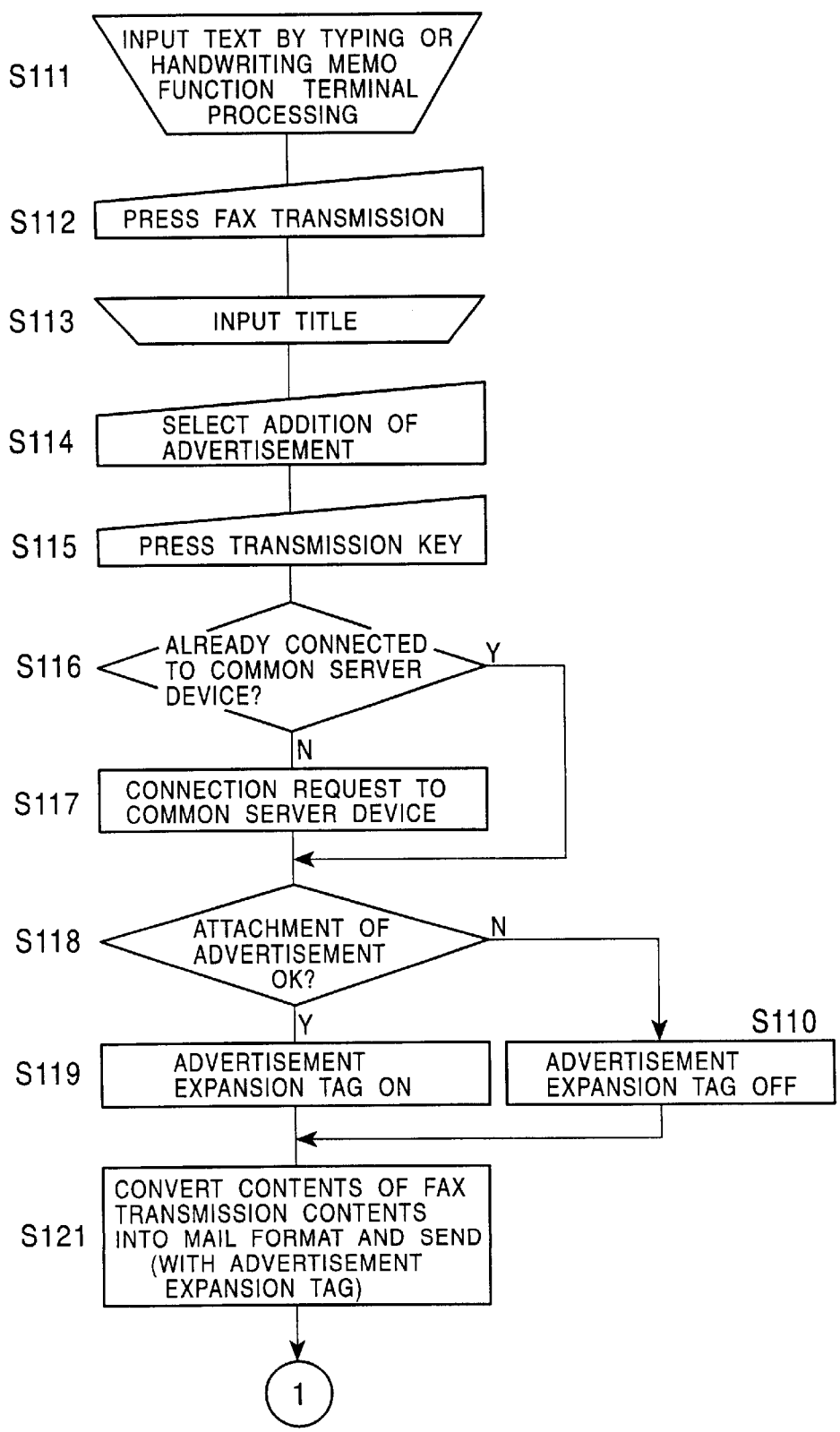
FIG. 15 is a flowchart illustrating the procedures at the portable wireless communication terminal for facsimile transmission in an embodiment of the information communication system according to the present invention.

As shown in FIG. 15, the user selects the memo function from the member terminal 1 as described above, and inputs the information to be faxed as either a handwritten memo or a typed memo (step S111). When the input of the text to be sent is completed, the "FAX transmission" icon on the screen of the LCD 105 is operated (step S112).

The screen of the LCD 105 changes to an input screen for the other party and the title of the transmitting data, so the telephone number of the other party and title text are input (step S113). Also, the screen of the LCD 105 displays "with advertisement" and "without advertisement" icon buttons, so the user selects one of the icons, thereby performing selection of whether to permit attachment of advertisements to the information to be sent to the other party. In the event that "with advertisement" is selected, attaching of advertisements is permitted, and in the event that "without advertisement" is selected, attaching of advertisements is forbidden (step S114). Subsequently, the user operates the "send" icon on the screen of the LCD 105 (step S115).

Then, the member terminal 1 judges whether or not connection is already established with the common server 2 (step S116), and in the event that, connection is not yet established with the common server 2, connection to the common server 2 is performed (step S117) using the address data of the common server 2 stored in the flash memory 124 and identification data of own member terminal 1 (such as mail address or so forth), via the ISP server device 71.

The ISP server 71 verifies whether or not the accessing terminal is a member terminal, and if this is a member terminal 1, the ISP server connects the member terminal 1 to the common server device 2.

After connection between the member terminal 1 and the common server device 2 has been established, the member terminal 1 makes reference to the advertisement attachment selection results, and judges whether or not attachment of advertisements is permitted (step S118). In the event that attachment of advertisements is permitted, the advertisement expansion tag serving as advertisement attachment control information is set to "ON" (step S119), and in the event that attachment of advertisements is not permitted, the advertisement expansion tag is set to "OFF" (step S120).

Next, the member terminal 1 changes the transmitting facsimile data into mail format, and sends it to the common server device 2 with the aforementioned advertisement expansion tag attached (step S121). Incidentally, in step S116, in the event that judgment is passed that the member terminal 1 and the common server device 2 are already connected, step S117 is bypassed, and step S118 and the subsequent steps are performed.

Figure 16:
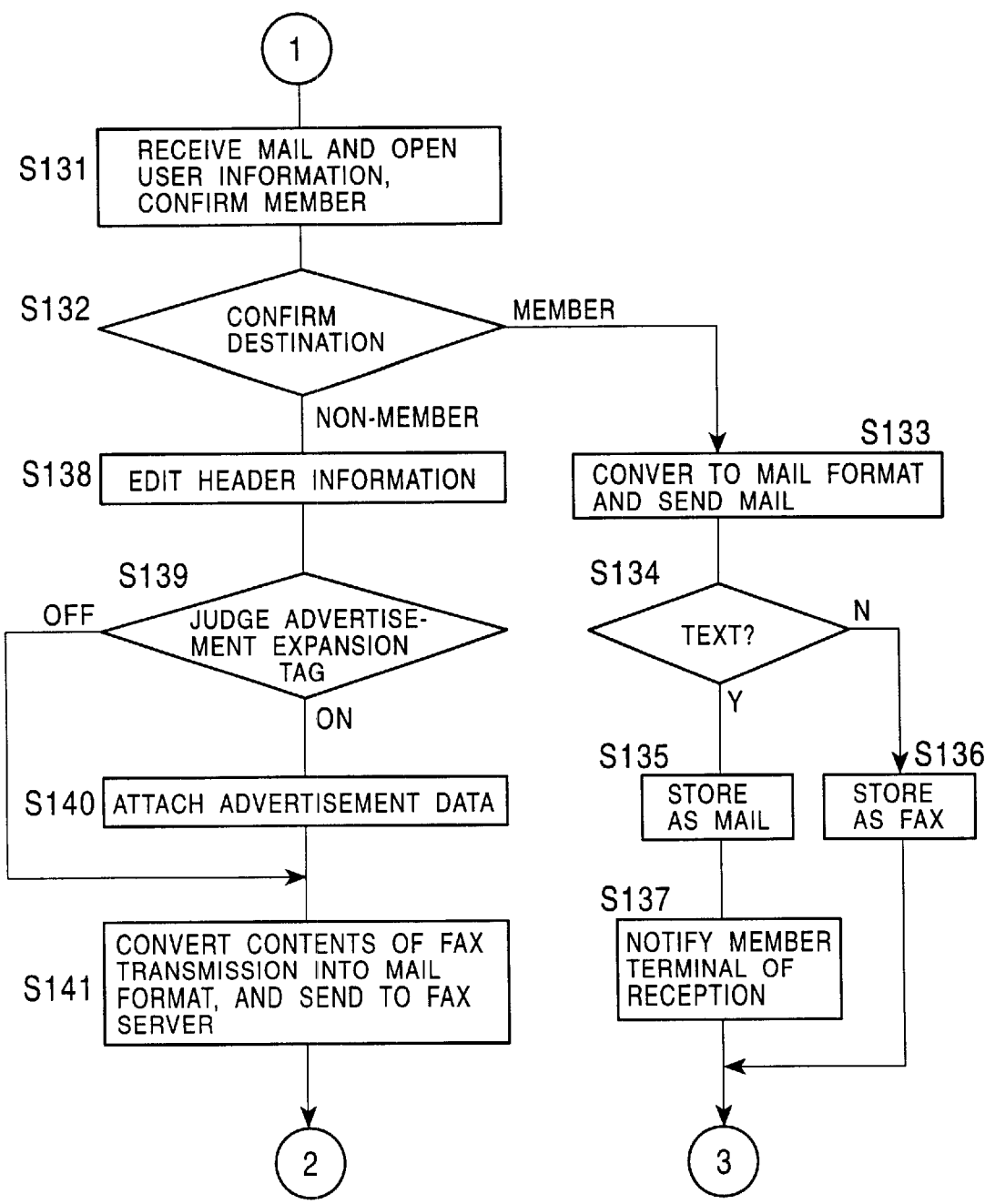
FIG. 16 is a flowchart illustrating a portion of the procedures at the common server device for facsimile transmission in an embodiment of the information communication system according to the present invention.

The mail server 22 of the common server device 2 receives the mail from the member terminal 1, as shown in FIG. 16, opens the user information (member identification information), and confirms whether or not the terminal is a member (step S131).

Next, the destination is confirmed, and in the event that the destination is a member terminal, the mail is converted into mail format, and sending thereof as electronic mail is determined (step S132). Further, judgment is made whether the mail consists only of text data, or whether there is image data included (step S134), and in the event that the mail consists only of text data, this is stored as mail in the received mail storage area for member terminals which is specified as the transmission destination of the mailbox 22M (step S135), and in the event that the mail includes image data, this is stored in the received facsimile storage area for member terminals which is specified as the transmission destination of the FAX box 23M (step S136), and this is added to the reception log of the member terminal. Then, regarding the member terminal 1, facsimile reception information is mail-transferred to the reception notification sever 24 in order to perform notification of reception (step S137).

Also, in the event that confirmation if the destination in step S22 reveals that the destination is a non-member, the header information is edited (step S138), and the advertisement expansion tag is judged (step S139). In the event that the advertisement expansion tag is set to "ON", advertisement data is attached to the contents of the facsimile (step S140), following which the facsimile transmission data with the advertisement attached thereto and converted in the mail format is sent to the facsimile server 23 by SMTP (step S141). In the event that the advertisement expansion tag is set to "OFF", advertisement data is not attached thereto, the flow proceeds to step S141, the facsimile transmission data with no advertisement attached thereto is converted into the mail format and sent to the facsimile server 23 by SMTP.

Figure 17:
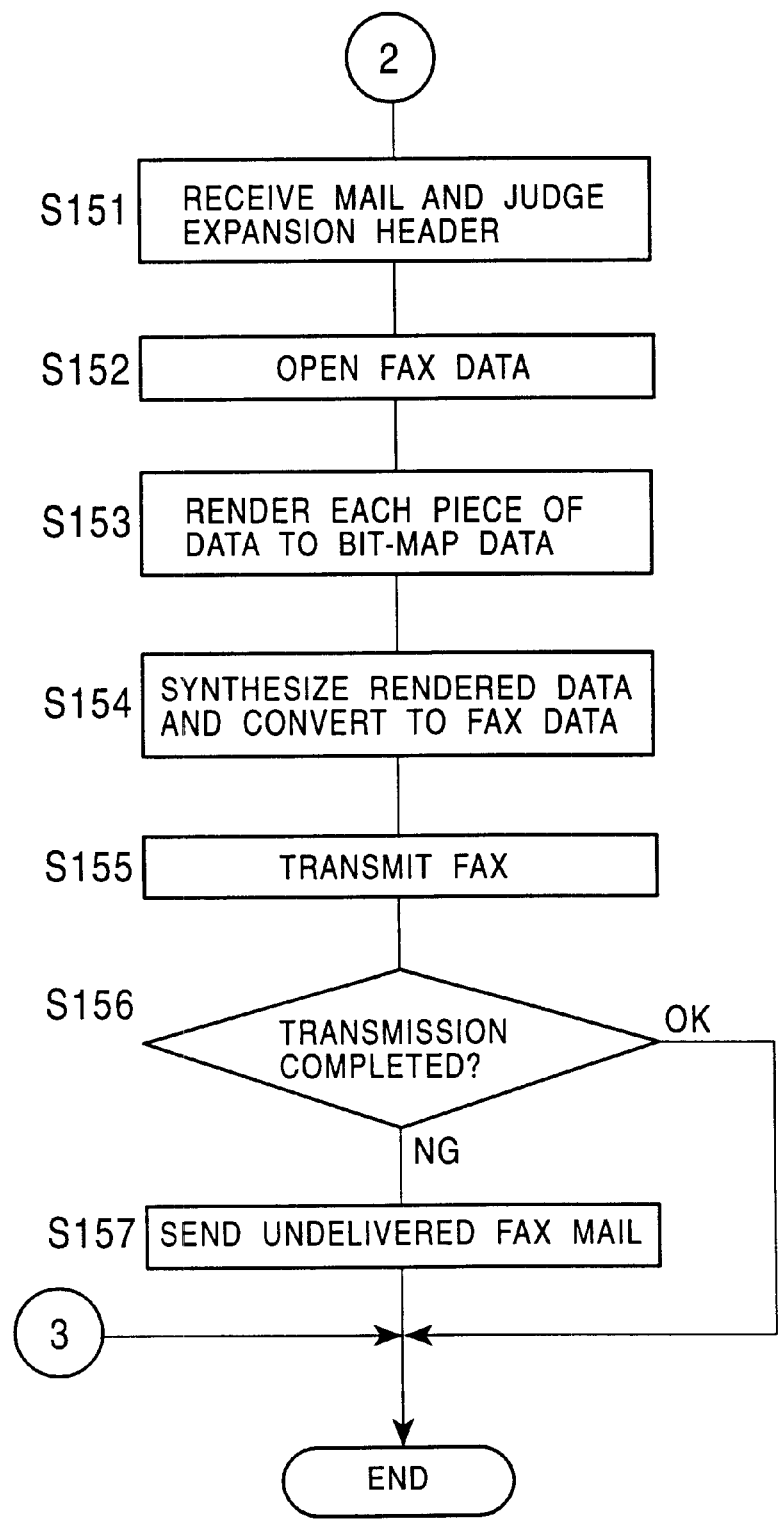
FIG. 17 is a flowchart illustrating a portion of the procedures at the common server device for facsimile transmission in an embodiment of the information communication system according to the present invention.

As shown in FIG. 17, the facsimile server receives the mail from the mail server 23 and judges the expansion header thereof (step S151). The facsimile data is opened as the header, main text, advertisement, etc. (step S152), and the opened data is rendered into bit-mat data (step S153). In other words, text data and GIF format image data are converted into bit-mat data according to the facsimile communication format.

Figure 18:
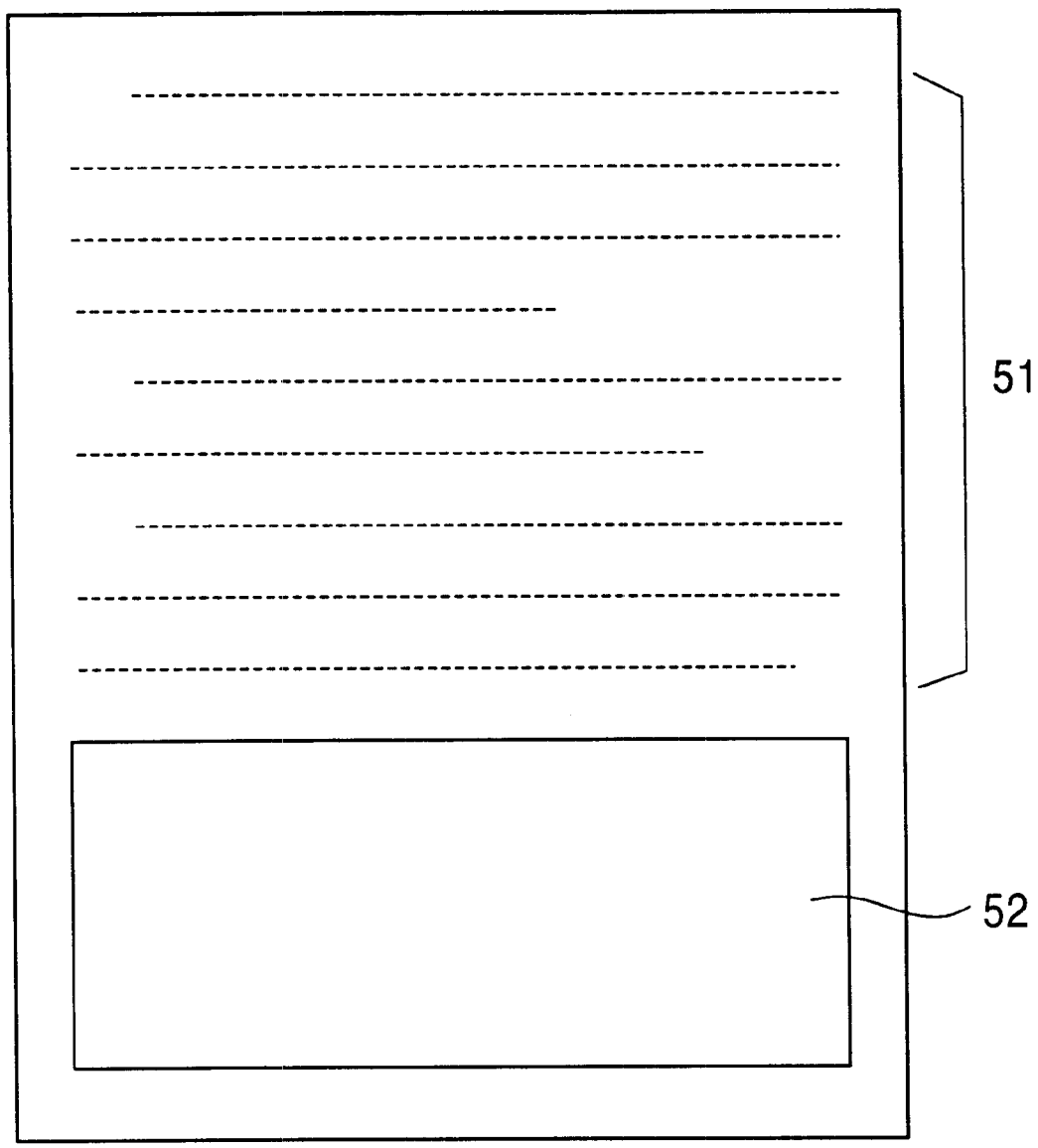
FIG. 18 is a diagram illustrating an example of a print-out of facsimile data to another party according to an embodiment of the information communication system of the present invention.

Then, the data of the rendered header, main text, advertisement, etc., are synthesized, thereby generating facsimile transmission data (step S154), and performs facsimile transmission of this to the other party terminal via the ISDN public line network (step S155). Then, confirmation is made whether or not transmission has been completed (step S156), and if completed, the processing ends there. Also, in the event that transmission could not be performed, the undelivered mail is sent to the mail server 22, thereby completing processing. At this time, in the event that advertisement data is included in the transmitted facsimile data, an advertisement 52 is attached to the facsimile information text as shown in FIG. 18 for example, and this is printed as a facsimile document from the facsimile device of the other party.

As described above, according to the present embodiment, the user of the member terminal 1 can perform wireless facsimile transmission by means of inputting the information to be faxed in the display screen of the LCD 105 and operating the "send" icon which means "FAX transmission" and executing of transmission.

In this case, there is no need for the user to make any input for connecting to the ISP server device, and the user is under the impression of actually sending the facsimile directly to the other party. In other words, where the user is concerned, facsimile transmission can be made from the portable wireless communication terminal according to the same procedures as with sending from a standard facsimile terminal.

Then, upon conducting the facsimile transmission, the user of the member terminal 1 permits attaching of advertisements to the information being sent to the other party, to realize facsimile communication at lower data transmission charges as compared with a case of no advertisements. This is because the service corporation managing the common server device 2 can set communication fees for the members lower due to advertisement income.

The above description has been made with reference to a case of facsimile transmission, but in the case of electronic mail transmission as well, an arrangement may be employed wherein permission or forbidding of attachment of advertisements is selected by the user of the member terminal, and the common sever device 2 attaches advertisements to the electronic mail data based on the selection and sends the mail to the other party.

Also, according to the above embodiment, the facsimile data and electronic mail data exchanged between member terminals is stored in the FAX box 23M or mailbox 22M of the common server device 2 and is handed to the member terminal at the time that there is a request from the member terminal to obtain the received data, so attaching of advertisements to information sent to the member terminal 1 was not described above, but it is needless to say that an arrangement may be employed wherein advertisement permission control data is stored in the FAX box 23M or mailbox 22M of the common server device 2, and at the time that there is a request from the member terminal to obtain the received data, reference is made regarding the advertisement permission control data thereof, and in the event that attaching of advertisements is permitted, an advertisement is attached and provided to the member terminal.

Of course, an arrangement might be employed wherein regarding exchange of mail between member terminals, the sender does not determine whether or not attaching of advertisements is permitted, but the member selects whether or not to permit attaching of advertisements at the time or requesting the received data, so that the receiver member determines attachment of advertisements.

Also, according to the above embodiment, description has been made regarding selecting permitting or forbidding of attachment of advertisements by the communication terminal, but in the case where a member enters into control with a common server device, the system may basically be such that advertisements are attached to information sent to the other party. In this case, an arrangement may be employed wherein the user can make special specifications to forbid attaching of advertisements, in which arrangement the charges can be set higher than normal. Conversely, an arrangement may be employed wherein basically no advertisements are attached, and the user can make special specifications to attach advertisements.

What is claimed is:

1. An information communication method, wherein a server device and a communication terminal are connected by a network, in which transmission of information to an other party specified by said communication terminal is performed by said communication terminal by operation of said server device, said method comprising the steps of:

causing said communication terminal to send information input in an input communication data format and advertisement permission control information attached to said information to said server device in a communication data format compatible with said network;

causing said server device to add advertisements selected based on user identification information that includes name, age, and sex and that is stored within said server device to said information sent from said communication terminal in accordance with said advertisement permission control information;

sending said information to said other party specified by said communication terminal;

performing transmission of said information to be transmitted between said communication terminal and said server device by a predetermined communication protocol and communication data format compatible with said network, regardless of a set communication format for transmitting said information which said other party has specified; and performing processing and conversion of said information for transmission to said other party into a communication protocol and communication data format compatible with said set communication format by said server device.

2. The information communication method according to claim 1 further comprising the steps of:

causing said communication terminal to attach advertisement permission control information relating to whether to permit attaching of advertisements to the information to be sent to said other party to said information and sending said information and attached advertisement permission control information to said server device; and causing said server device to determine whether to attach advertisements to the information to be sent to the other party specified by said communication terminal, based on said advertisement permission control information.

3. The information communication method according to claim 1, wherein said set communication format is a facsimile communication format, further comprising the steps of:

compressing image data to be sent and received between said communication terminal and said server device according to an image compression method compatible with said network; and performing conversion between said compression image data and facsimile communication format data by said server device.

4. The information communication method according to claim 1, wherein said communication terminal is a portable wireless communication terminal, further comprising the step of connecting said communication terminal and said server device in a wireless manner via said network.

5. The information communication method according to claim 1,
wherein said communication terminal is a portable wireless communication terminal having wireless-type telephone functions, and a network for telephones of said wireless-type is included in said network.

6. An information communication system, wherein a server device and a communication terminal are connected by a network, in which transmission of information with an other party specified is performed by said communication terminal cooperating with said server device,
said communication terminal comprising:
server connecting means for sending connection requests to said server device, thereby connecting with said server via said network;
originating operation accepting means for accepting originating operations in which a user of said communication terminal has specified said other party; and
sending means for sending advertisement permission control information and data input in an input communication data format to be sent to said server device with which connection has been made by said server connecting means, and converting said data according to a communication method compatible with said network, in the event that said originating operation is accepted at said originating operation accepting means; and
said server device comprising:
connecting means receiving a connection request from said communication terminal and connecting with said communication terminal via said network; and
transmission executing means for attaching advertisements selected based on user identification information that includes name, age, and sex and that is stored within said server device to outgoing information being sent in accordance with said advertisement permission control information and for sending said outgoing information and attached advertisements to said other party specified by said communication terminal,
wherein transmission of said information to be transmitted is performed between said communication terminal and server device by a predetermined communication protocol and communication data format compatible with said network, regardless of a set communication format for transmitting said information which said other party has specified,
and wherein processing and conversion of said information for transmission to said other party into a communication protocol and communication data format compatible with said set communication format is performed by said server device.

7. The information communication system according to claim 6, wherein said communication terminal further comprises means for attaching advertisement permission control information relating to whether to permit attaching of advertisements to the information to be sent to said other party;
and said server device further means for determining whether to attach advertisements to the information to be sent to the other party specified by said communication terminal, based on said advertisement permission control information.

8. The information communication system according to claim 6,
wherein said set communication format is a facsimile communication format, image data to be sent and received between said communication terminal and said server device being compressed according to an image compression method compatible with said network;
and wherein conversion between said compression image data and facsimile communication format data is performed by said server device.

9. The information communication system according to claim 6, wherein said communication terminal is a portable wireless communication terminal, and said communication terminal and said server device are connected in a wireless manner via said network.

10. The information communication system according to claim 6,
wherein said communication terminal is a portable wireless communication terminal having wireless-type telephone functions, and a network for telephones of said wireless-type is included in said network.

11. A communication terminal connected to a server device by a network by which transmission of information with an other party specified is performed by cooperating with said server device, said communication terminal comprising:
specification input means for specifying whether to permit attaching of advertisements to said information to be sent to said other party; and
sending means for attaching advertisement permission control information relating to whether to permit attaching of advertisements selected based on user identification information that includes name, age, and sex and that is stored within said server device to said information to be sent to said other party, according to a permission specified by said specification input means;
converting means for converting said information to be sent to said other party input in an input communication data format to a communication data format compatible with said network,
wherein transmission .of said information to be transmitted is performed by said server device using a predetermined communication protocol and communication data format compatible with said network, regardless of a set communication format for transmitting the information which the other party has specified, and wherein said information is converted by said server device into a communication protocol and communication data format compatible with said set communication format.

12. A server device connected with a communication terminal by a network in which transmission of information with an other party specified is performed by said communication terminal by cooperating with said communication terminal, said server device comprising:
connecting means for receiving connection requests from said communication terminal and for connecting with said communication terminal via said network; and
transmission executing means for attaching advertisements selected based on user identification information that includes name, age, and sex and that is stored within said server device to said information input in an input communication data format and converted and sent from said communication terminal by a predetermined communication protocol and a communication data format compatible with said network in accordance with advertisement permission control information attached to said information and for sending to said other party specified by said communication terminal, wherein transmission of said information to be transmitted is performed with said communication terminal by a predetermined communication protocol and a communication data format compatible with said network regardless of a set communication format for transmitting the said information which said other party has specified and further comprising processing and converting means for sending said information to said other party in a communication protocol and communication data format that is compatible with said set communication format.

13. The server device according to claim 12, wherein said information from said communication terminal includes advertisement permission control information relating to whether to permit attaching advertisements to information sent to the other party, and further comprising means for determining whether to attach advertisements to information which the other party has specified by said communication terminal.

14. The server device according to claim 12, wherein said set communication format is a facsimile communication format, image data to be sent and received between said communication terminal and said server device being compressed according to an image compression method compatible with said network, and further comprising means for converting between said compression image data and facsimile communication format and sending to said other party.

15. The server device according to claim 12, wherein said communication terminal is a portable wireless communication terminal, and said server device is connected with said communication terminal in a wireless manner via said network.

16. A communication terminal according to claim 12, wherein said communication terminal is a portable wireless communication terminal also having wireless-type telephone functions, and a network for telephones of said wireless-type is included in said network.

* * * * *